US008229177B2

(12) United States Patent
Duffy et al.

(10) Patent No.: US 8,229,177 B2
(45) Date of Patent: Jul. 24, 2012

(54) DATA PROCESSING APPARATUS AND METHOD

(75) Inventors: Dominic Gavan Duffy, Cambridgeshire (GB); Aled Wynne Jones, Cambridgeshire (GB)

(73) Assignee: Fountain Venture AS, Oslo (NO)

( * ) Notice: Subject to any disclaimer, the term of this patent is extended or adjusted under 35 U.S.C. 154(b) by 1097 days.

(21) Appl. No.: 10/478,827

(22) PCT Filed: May 31, 2002

(86) PCT No.: PCT/GB02/02512
§ 371 (c)(1),
(2), (4) Date: Jun. 10, 2004

(87) PCT Pub. No.: WO02/098053
PCT Pub. Date: Dec. 5, 2002

(65) Prior Publication Data
US 2004/0243356 A1 Dec. 2, 2004

(30) Foreign Application Priority Data
May 31, 2001 (GB) .................................. 0113255.4

(51) Int. Cl.
*G06K 9/00* (2006.01)
(52) U.S. Cl. ..................... 382/115; 382/117; 382/118
(58) Field of Classification Search .......... 382/115–127; 902/3, 6; 380/44; 340/5.53, 5.83; 713/161
See application file for complete search history.

(56) References Cited

U.S. PATENT DOCUMENTS

| 4,109,237 | A | | 8/1978 | Hill | |
| 4,135,147 | A | * | 1/1979 | Riganati et al. | ............... 382/125 |
| 4,187,392 | A | | 2/1980 | Safford | |
| 4,316,055 | A | | 2/1982 | Feistel | |
| 4,641,349 | A | | 2/1987 | Flom et al. | |
| 4,805,222 | A | * | 2/1989 | Young et al. | ................. 382/115 |
| 5,067,162 | A | * | 11/1991 | Driscoll et al. | ............... 382/126 |
| 5,291,560 | A | | 3/1994 | Daugman | |
| 5,347,580 | A | | 9/1994 | Molva et al. | |

(Continued)

FOREIGN PATENT DOCUMENTS
CN 1281608 A 1/2001
(Continued)

OTHER PUBLICATIONS

Claus et al, "Biometric hash based on statistical features of online signatures", Pattern Recognition, 2002. Proceedings. 16th International Conference on Publication Date: 2002 , vol. 1, on pp. 123-126 vol. 1 ISSN: 1051-4651.*

(Continued)

*Primary Examiner* — Andrae S Allison
(74) *Attorney, Agent, or Firm* — Smith Gambrell & Russell LLP

(57) ABSTRACT

There is decribed an apparatus for generating a number from data originating from an analogue source, the apparatus comprising means for performing a set of the data and then processing, in accordance with stored processing instructions predetermined by a training process, the data to generate the number. During the training process, the sensitivity of the value of the generated number to variation in each of the measurement values is analyzed, and the process instructions are generated so that the processing of individual measurement values is modified to reduce this sensitivity. In this way, the repeatability of the generated number is improved.

166 Claims, 27 Drawing Sheets

U.S. PATENT DOCUMENTS

| | | | |
|---|---|---|---|
| 5,497,430 A | 3/1996 | Sadovnik et al. | |
| 5,541,994 A | 7/1996 | Tomko et al. | |
| 5,680,460 A | 10/1997 | Tomko et al. | |
| 5,680,470 A * | 10/1997 | Moussa et al. | 382/119 |
| 5,712,807 A | 1/1998 | Bangham | |
| 5,832,091 A | 11/1998 | Tomko et al. | |
| 5,933,516 A | 8/1999 | Tu et al. | |
| 5,991,408 A | 11/1999 | Pearson et al. | |
| 6,035,398 A * | 3/2000 | Bjorn | 713/186 |
| 6,038,315 A | 3/2000 | Strait et al. | |
| 6,067,369 A | 5/2000 | Kamei | |
| 6,078,667 A | 6/2000 | Johnson | |
| 6,098,330 A | 8/2000 | Schmitt et al. | |
| 6,154,285 A | 11/2000 | Teng et al. | |
| 6,170,073 B1 | 1/2001 | Jarvinen et al. | |
| 6,185,316 B1 | 2/2001 | Buffam | |
| 6,202,151 B1 | 3/2001 | Musgrave et al. | |
| 6,219,794 B1 | 4/2001 | Soutar et al. | |
| 6,330,674 B1 | 12/2001 | Angelo et al. | |
| 6,363,485 B1 * | 3/2002 | Adams et al. | 713/186 |
| 6,567,765 B1 | 5/2003 | Wu et al. | |
| 6,678,821 B1 | 1/2004 | Waugh et al. | |
| 6,687,375 B1 | 2/2004 | Matyas et al. | |
| 6,901,145 B1 * | 5/2005 | Bohannon et al. | 380/44 |
| 6,940,976 B1 | 9/2005 | Matyas et al. | |
| 6,957,337 B1 | 10/2005 | Chainer et al. | |
| 6,959,874 B2 * | 11/2005 | Bardwell | 235/493 |
| 6,964,023 B2 * | 11/2005 | Maes et al. | 715/811 |
| 6,968,459 B1 | 11/2005 | Morgan et al. | |
| 7,046,829 B2 * | 5/2006 | Udupa et al. | 382/124 |
| 7,200,549 B1 | 4/2007 | Fujii et al. | |
| 7,274,804 B2 * | 9/2007 | Hamid | 382/115 |
| 7,526,653 B1 | 4/2009 | Vogel et al. | |
| 2001/0025342 A1 | 9/2001 | Uchida | |
| 2002/0056040 A1 | 5/2002 | Simms | |
| 2002/0124176 A1 | 9/2002 | Epstein | |
| 2002/0174347 A1 | 11/2002 | Ting | |
| 2002/0199103 A1 | 12/2002 | Dube | |
| 2003/0179909 A1 * | 9/2003 | Wong et al. | 382/115 |
| 2003/0204732 A1 | 10/2003 | Audebert et al. | |
| 2003/0217264 A1 | 11/2003 | Martin et al. | |
| 2004/0107367 A1 | 6/2004 | Kisters | |
| 2004/0111625 A1 | 6/2004 | Duffy et al. | |
| 2004/0128502 A1 | 7/2004 | Royer | |
| 2004/0218762 A1 | 11/2004 | Le Saint et al. | |
| 2004/0243356 A1 | 12/2004 | Duffy et al. | |
| 2005/0021954 A1 | 1/2005 | Kung | |
| 2005/0246763 A1 | 11/2005 | Corcoran et al. | |
| 2006/0075255 A1 | 4/2006 | Duffy et al. | |
| 2006/0083372 A1 | 4/2006 | Chang et al. | |
| 2006/0090114 A1 | 4/2006 | Duffy et al. | |
| 2006/0153369 A1 | 7/2006 | Beeson | |
| 2006/0198514 A1 | 9/2006 | Lyseggen et al. | |
| 2006/0227974 A1 | 10/2006 | Haraszti | |
| 2008/0216147 A1 | 9/2008 | Duffy | |

FOREIGN PATENT DOCUMENTS

| | | |
|---|---|---|
| DE | 42 43 908 A1 | 6/1994 |
| DE | 4243908 A1 | 6/1994 |
| DE | 197 15 644 A 1 | 10/1998 |
| DE | 19715644 A1 | 10/1998 |
| DE | 199 36 097 A1 | 2/2001 |
| DE | 19936097 A1 | 2/2001 |
| EP | 0779595 A2 | 6/1997 |
| EP | 0786735 A2 | 7/1997 |
| JP | 4-55849 U | 5/1992 |
| JP | 9-147072 A | 6/1997 |
| JP | 9-161053 A | 6/1997 |
| JP | 11-73103 A | 3/1999 |
| WO | WO 98/48538 | 10/1998 |
| WO | WO 99/65175 | 12/1999 |
| WO | WO 00/14716 | 3/2000 |
| WO | WO 00/51280 | 8/2000 |
| WO | WO 00/65770 | 11/2000 |
| WO | WO 00/74301 A1 | 12/2000 |
| WO | WO 01/63385 A1 | 8/2001 |
| WO | WO 02/052480 A1 | 7/2002 |
| WO | WO 02/065693 A2 | 8/2002 |
| WO | WO 02/098053 A2 | 12/2002 |
| WO | WO 03/034655 A1 | 4/2003 |
| WO | WO 03/065169 A2 | 8/2003 |
| WO | WO 03/103216 A2 | 12/2003 |
| WO | WO 03/103217 A1 | 12/2003 |
| WO | WO 2004/006076 A2 | 1/2004 |
| WO | WO 2005/121921 A1 | 12/2005 |

OTHER PUBLICATIONS

Co-pending U.S. Appl. No. 10/516,174, filed Nov. 30, 2004.

Co-pending U.S. Appl. No. 10/516,173, filed Nov. 30, 2004.

Monrose et al.; "Cryptographic Key Generation From Voice"; IEEE Symposium on Security and Privacy, pp. 202-213, (2001).

Daugman; "How Iris Recognition Works"; University of Cambridge, The Computer Laboratory, Cambridge CB2 3QG, U.K., www.CL.cam.ac.uk/users/Igd1000/, pp. 1-10.

"Secure Execution Engine", White Paper, pp. 1-11, NCIPHER.

Říha et al.; "Biometric Authentication Systems"; FI MU, XP-002218011, pp. 1-44, (2000).

Daugman; "High Confidence Visual Recognition of Persons by a Test of Statistical Independence"; IEEE TRansactions on Pattern Analysis and Machine Intelligence, vol. 15, No. 11, pp. 1148-1161, (1993).

Davida et al.; "On the Relation of Error Correction and Crytography to an Off Line Biometric Based Identification Scheme", pp. 1-10, (1998).

Claus et al., "Biometric Hash Based on Statistical Features of Online Signatures", Pattern Recognition, 2002, Proceedings.16th International Conference on Publication Date:2002, vol. 1, pp. 123-126.

Hao et al., "Combining Crypto with Biometrics Effectively", IEEE Transactions on Computers. Sep. 2006, pp. 1081-1088, vol. 55, No. 9, IEEE Computer Society.

Uludag et al., "Biometric Cryptosystems: Issues and Challenges", Proceedings of the IEEE, Jun. 2004, vol. 92, No. 6. pp. 948-960.

Daugman, "How IRIS Recognition Works", pp. 1-10, University of Cambridge, The Computer Laboratory. Cambridge CB2 3QG, U.K., www.CL.Cam.ac.uk/users/jdg1000.

Monrose et al., "Cryptographic Key Generation From Voice", IEEE Symposium on Security and Privacy, 2001, pp. 202-213.

"Secure Execution Engine" White Paper. pp. 1-11, NCIPHER.

Riha et al. "Biometric Authentication Systems", FI MU Report Series, Nov. 2000. pp. 1-44, Faculty of Informatics Masaryk University.

Daugman, "High Confidence Visual Recognition of Persons by a Test of Statistical Independence", IEEE Transactions on Pattern Analysis and Machine Intelligence, vol. 15, No. 11, Nov. 1993, pp. 1148-1161.

Davida et al., "On the Relation of Error Correction and Cryptography to an Off Line Biometric Based Identification Scheme," Nov. 29, 1998, pp. 1-10.

Client Security in the Enterprise Network: DELL's Perspective, DELL Highlight, Feb. 2000, pp. 1-6.

Cavoukian et al., "Biometric Encryption: A Positive—Sum Technology that Achieves Strong Authentication", Security and Privacy, Mar. 2007, pp. 1-48, Information and Privacy Commissioner.

Clancy, Secure Smartcard—Based Fingerprint Authentication, WBMA'03, Nov. 8, 2003, pp. 45-52, Berkeley, California, USA.

Mark, The Development of Destination—Specific Biometric Authentication, pp. 77-80.

UMTS 33.22 V1.0.0. 3GPP Systems and Services TSG, Security WG. Feb. 2-4, 1999, pp. 1-18.

\* cited by examiner

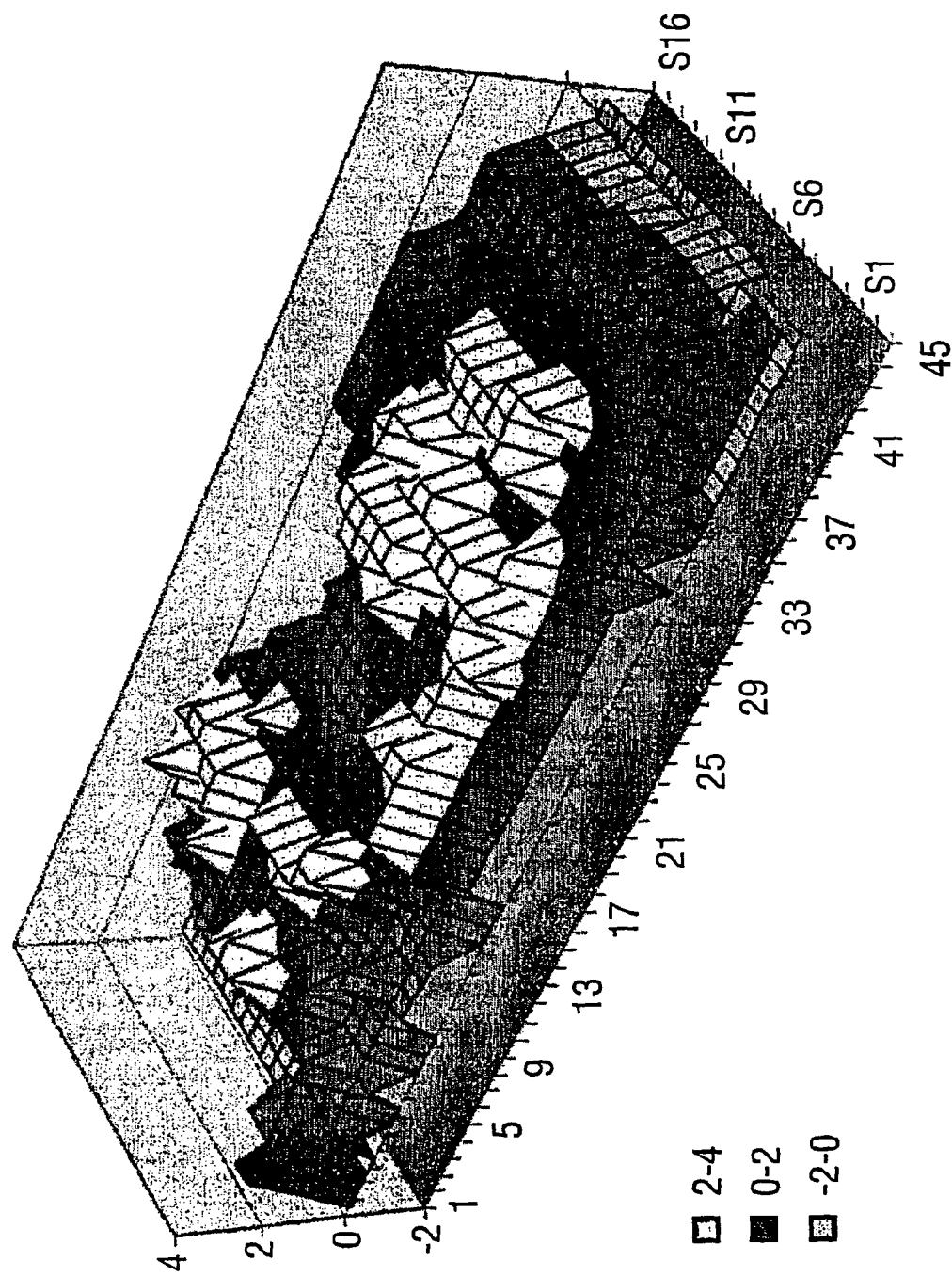

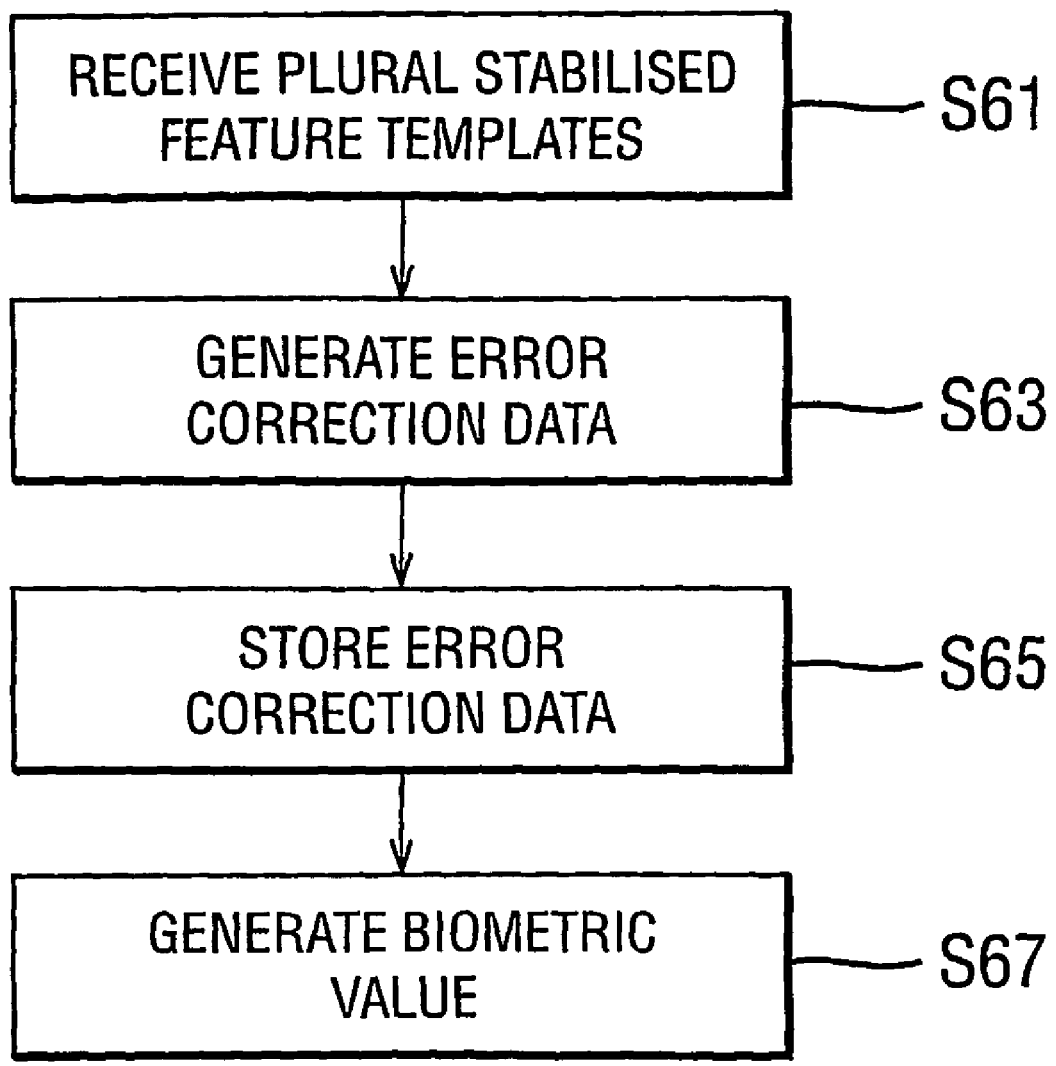

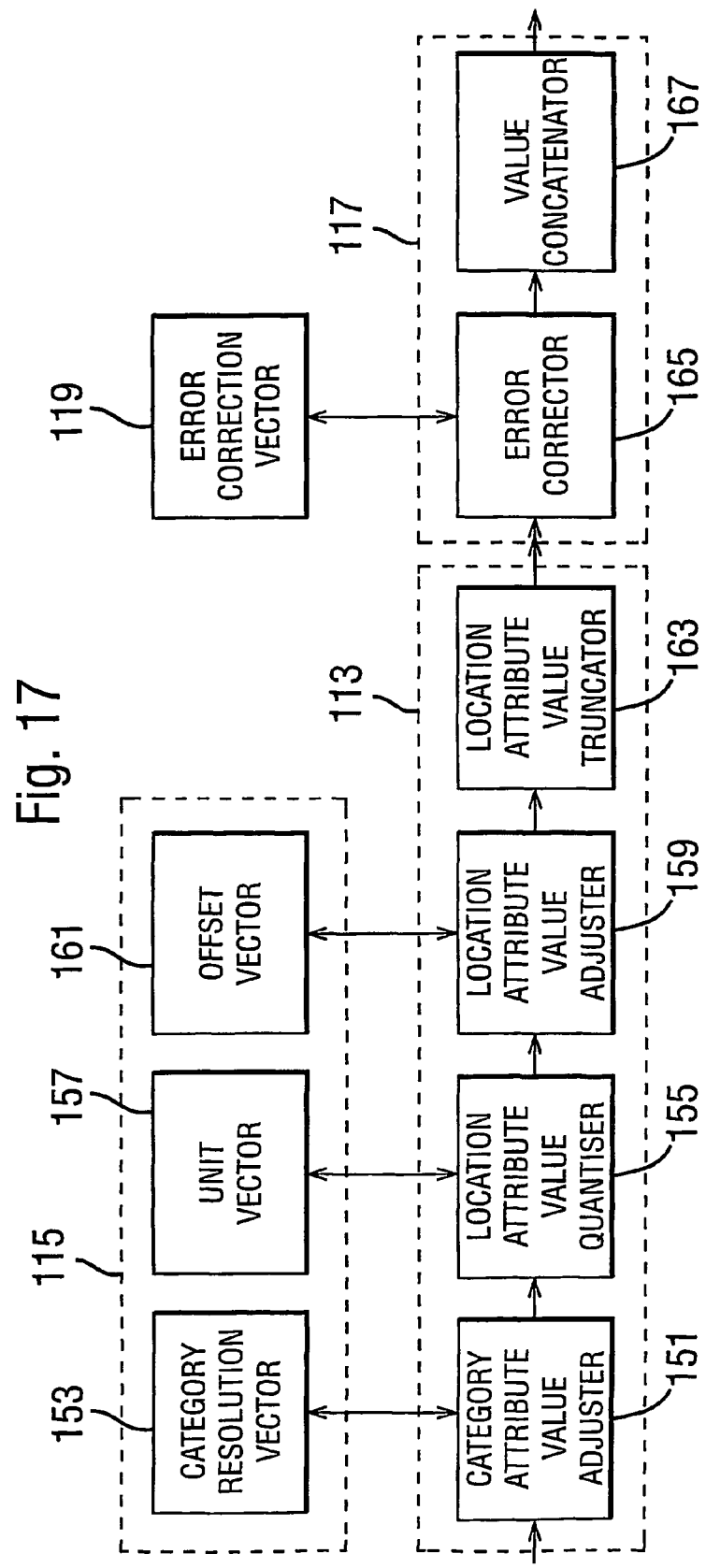

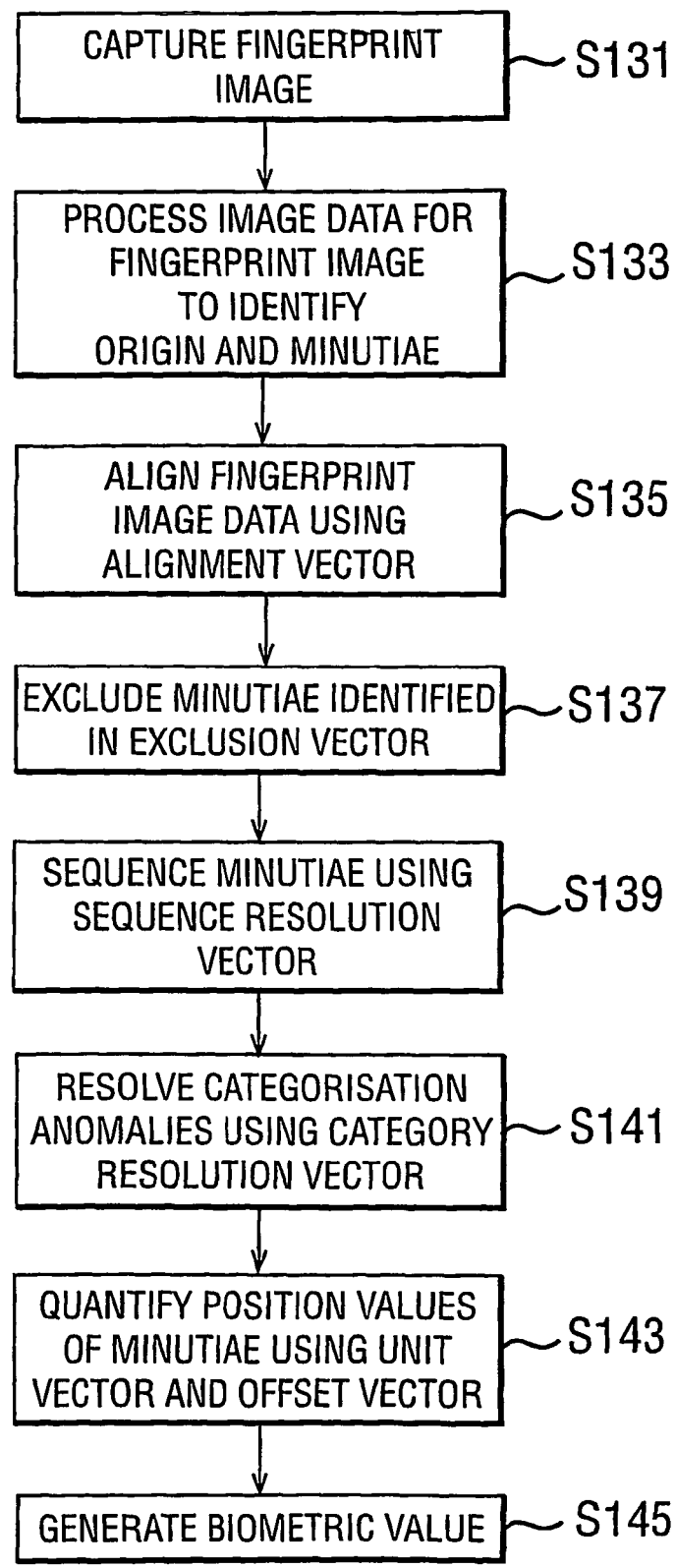

DATA PROCESSING APPARATUS AND METHOD

This invention relates to the generation of a number representative of data from an analogue source. The invention has particular, but not exclusive, relevance to generating a number representative of an individual by processing biometric data associated with the individual.

There are a number of characteristics which are indicative of an individual, and these characteristics have been measured by identification systems to generate biometric data representative of the individual. In most known biometric identification systems, the measured biometric data is compared with previously stored biometric data and a confidence value is calculated indicating how close the measured biometric data is to the stored biometric data. Based on this confidence value, a decision is made regarding whether or not a positive identification is established.

In recent years, it has been recognised that biometric data could be used to generate a number, hereafter called the biometric value $K_{bio}$, which could be used as a personal identification number (PIN) or a cryptographic key. This removes the requirement for an individual to remember, or to keep a permanent record of, the personal identification number or the cryptographic key because it can be generated whenever needed by obtaining a new set of biometric data from the individual and regenerating the biometric value. This is advantageous because people commonly forget numbers and permanent records are not always securely stored. However, for such an application to work reliably the repeatability of the biometric value must be high. Further, it is desirable that the biometric value is as large as possible to improve security.

German Patent Application DE 4243908A1 discusses using a biometric value calculated from biometric data associated with a person, for example generated by scanning a fingerprint, as the seed number of an RSA (Rivest-Shamir-Adelman) key generator in order to generate a public key $K_{pub}$ and private key $K_{pri}$ pair. DE 4243908A1 does not, however, describe how to generate the biometric value with a high level of repeatability.

International Patent Publication WO 98/48538 discusses an encryption system in which biometric data is processed by a filter to regenerate directly a private key $K_{pri}$ for the RSA algorithm. For each bit of the private key $K_{pri}$, the filter compares a number of binary digits of the biometric data which were found during an enrolment process be identical, and selects the binary digit which appears most often.

The problem addressed by the present invention is how to improve the repeatability of a number generated from data originating from an analogue source.

According to an aspect of the invention, there is provided an apparatus for generating a number from data originating from an analogue source, the apparatus comprising means for performing a set of measurements of the data and then processing, in accordance with stored processing instructions predetermined by a training process, the data to generate the number. During the training process, the sensitivity of the value of the generated number to variations in one or more of the measurement values is analysed, and process instructions generated which modify the processing of selected measurement values to reduce this sensitivity. In this way, the repeatability of the generated number is improved.

The analogue source could be any biological feature representative of a person or animal. For example, the analogue source could be an iris of an eye, a retina or a fingerprint. Alternatively, the analogue source could be an inanimate object which has a distinctive property, for example a photograph whose image is distinctive.

Various embodiments of the invention will now be described with reference to the accompanying figures, in which:

FIG. 1 schematically shows a biometric value generator which generates a biometric value from image data corresponding to an iris;

FIG. 2 schematically shows the main components of an image converter and a feature template generator which forms part of the biometric value generator illustrated in FIG. 1;

Figure 1:
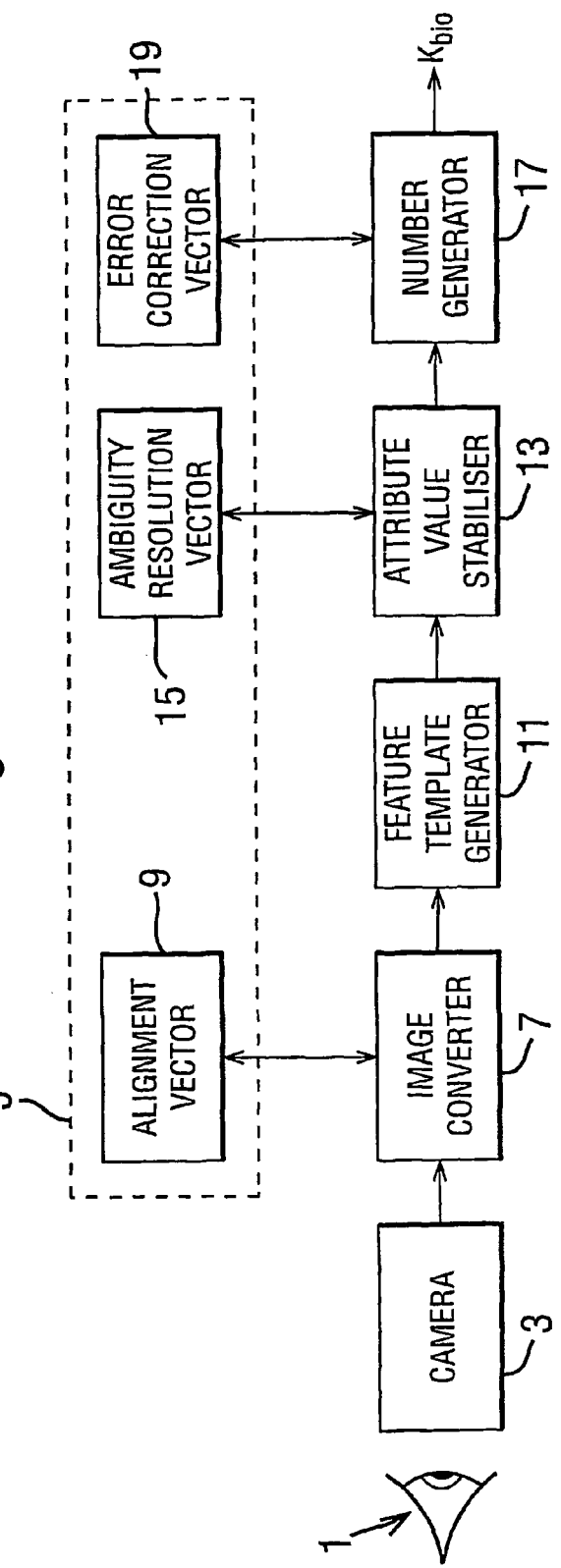
Figure 7:
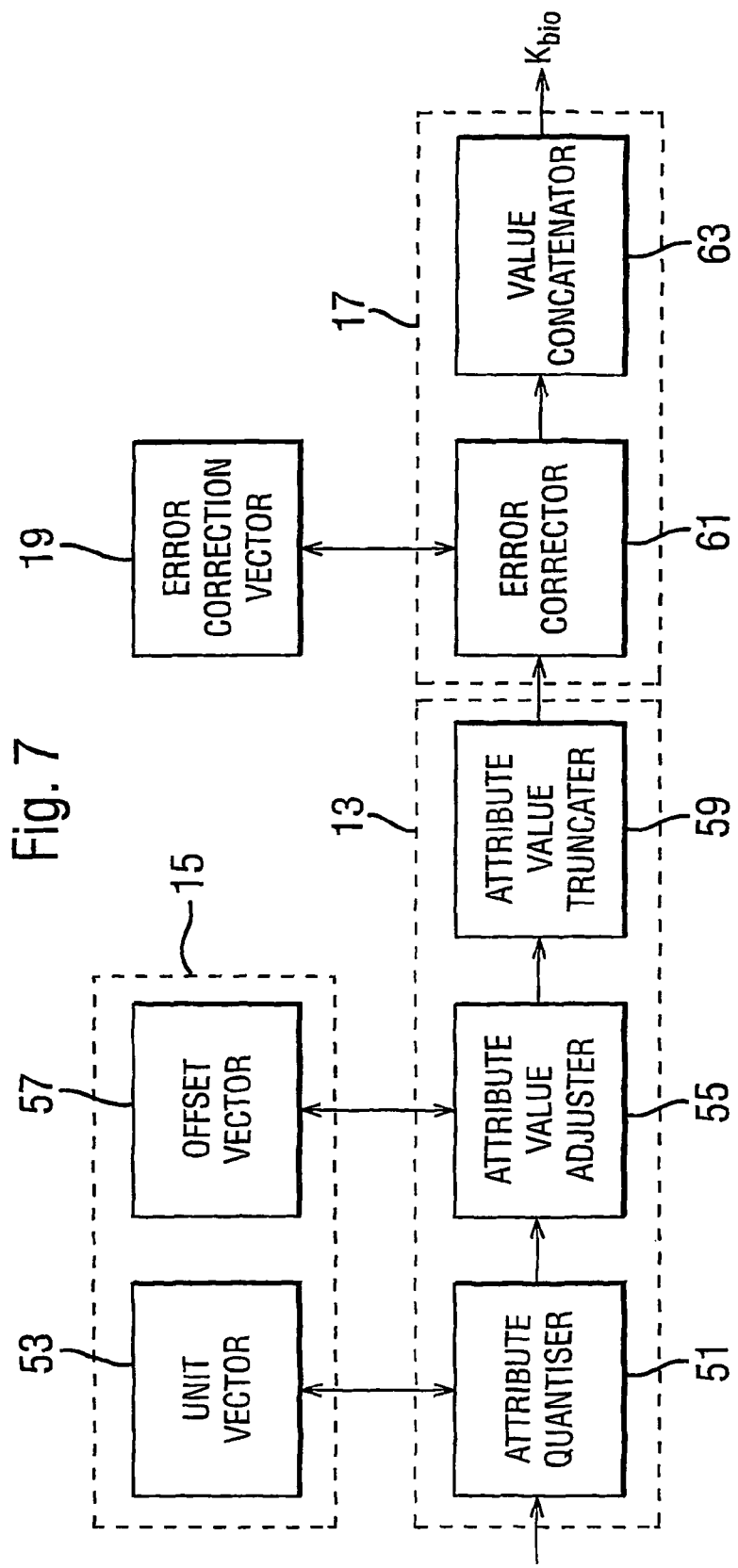
Figure 8:
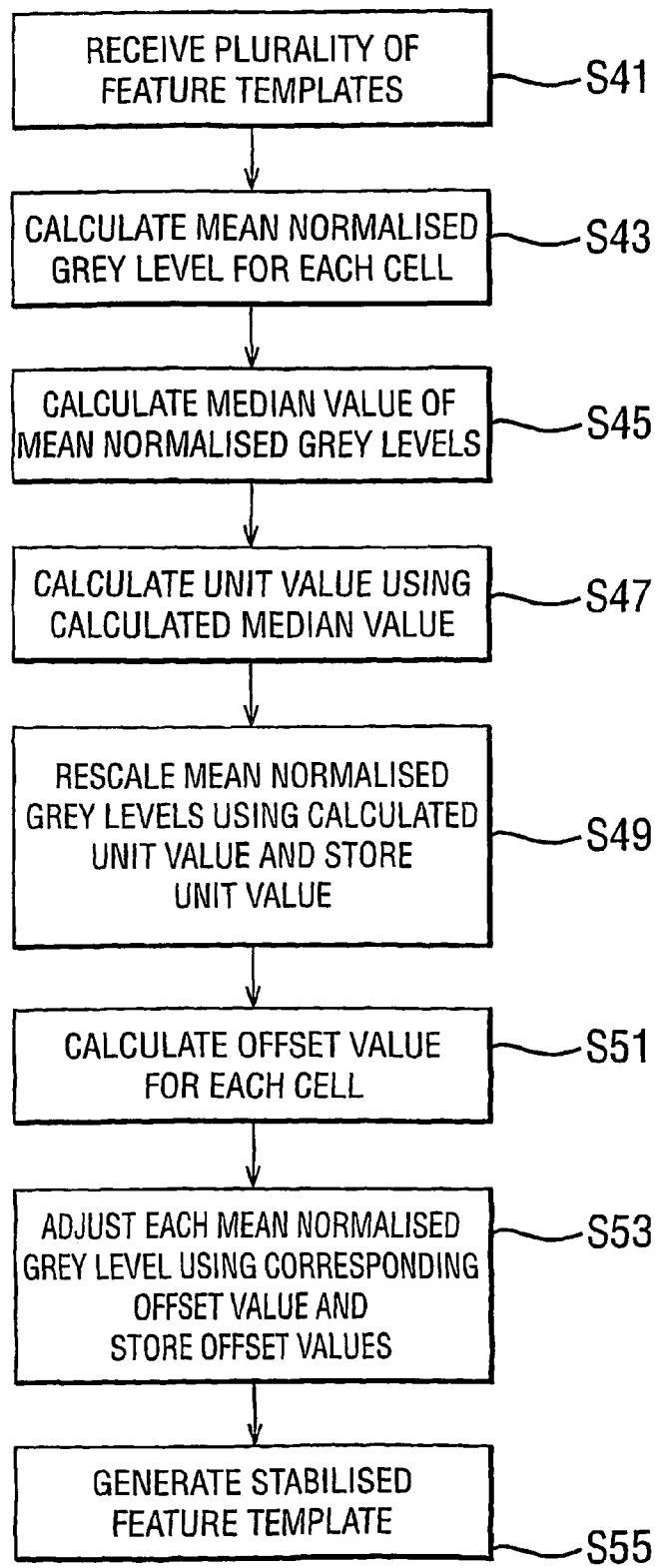
Figure 9B:
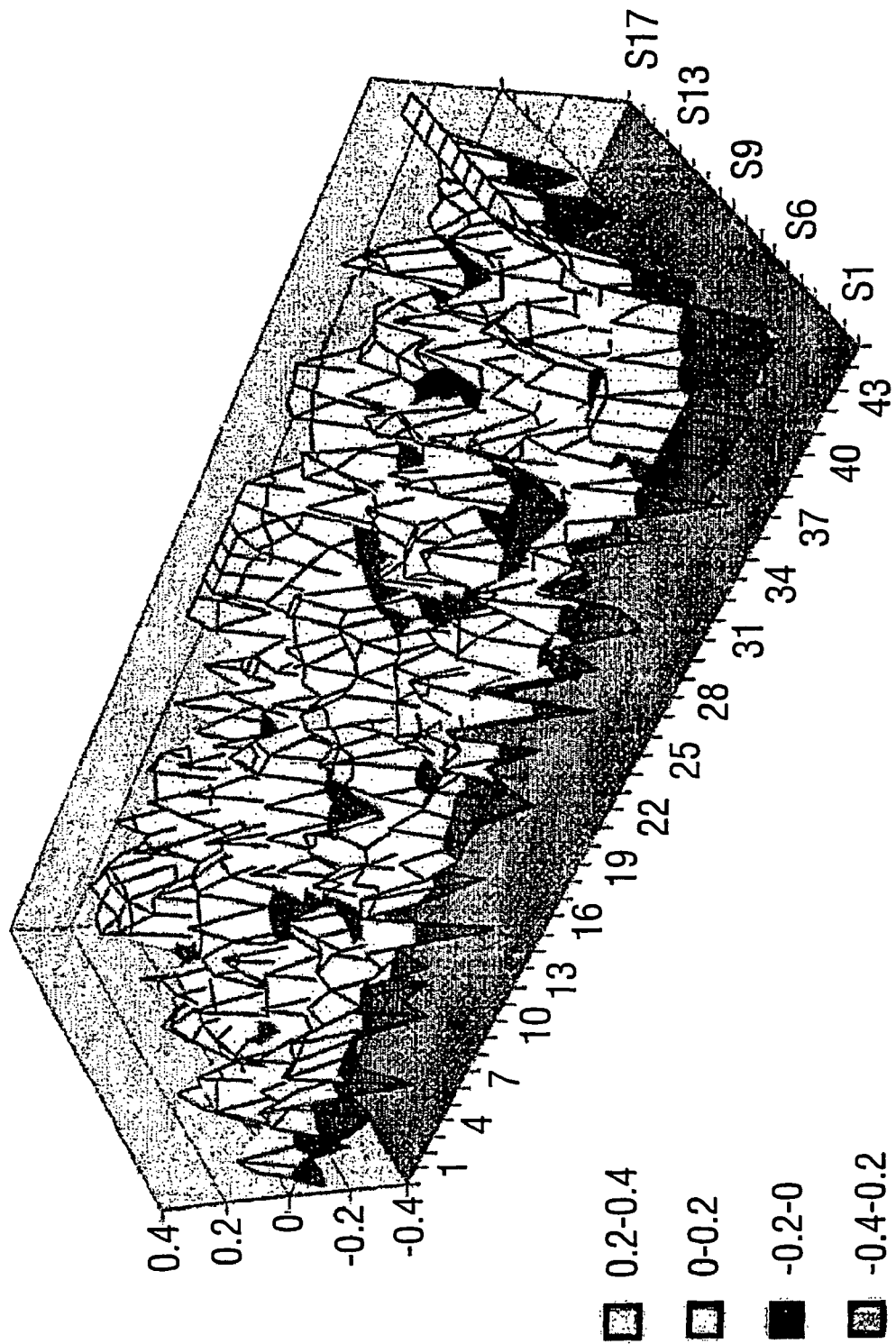
Figure 11:
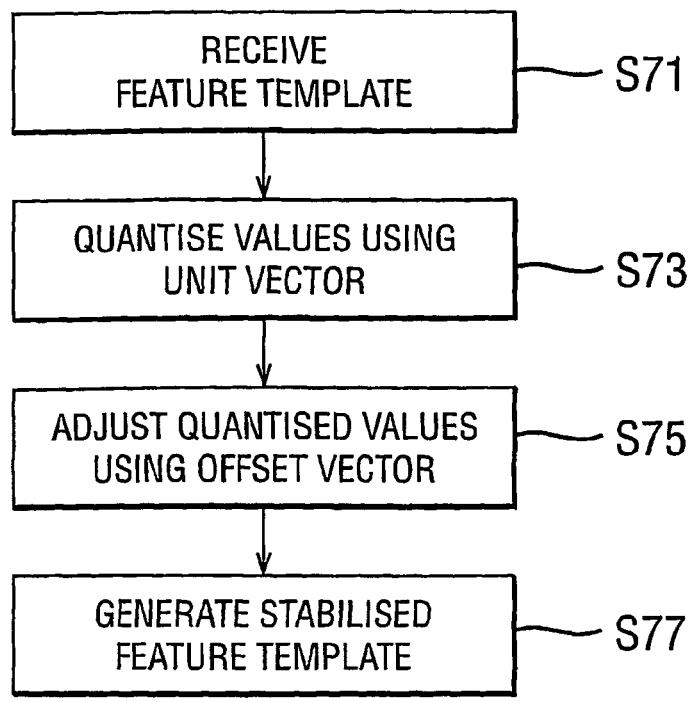
Figure 12:
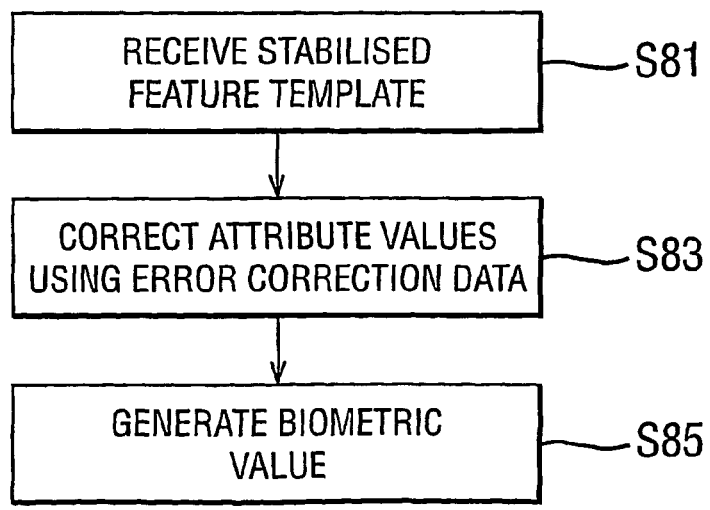
Figure 13:
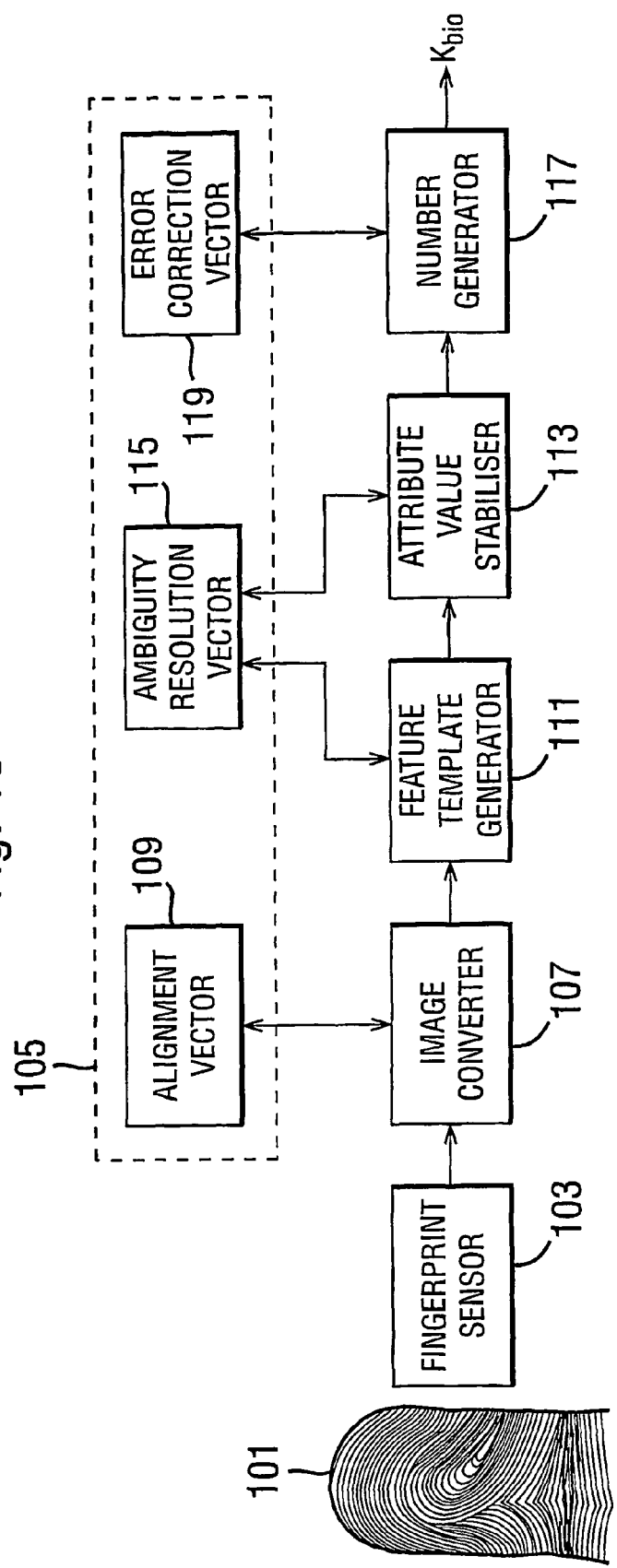
Figure 14:
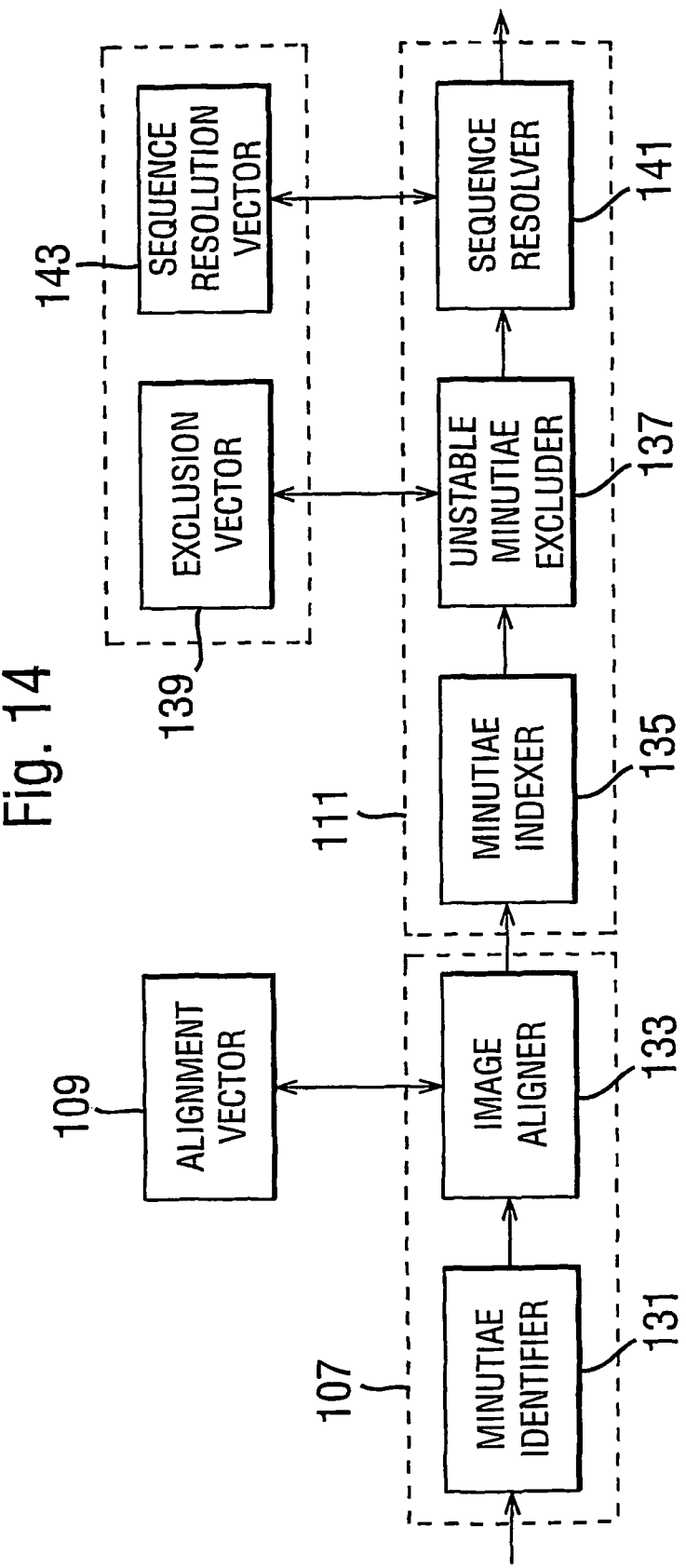
Figure 15:
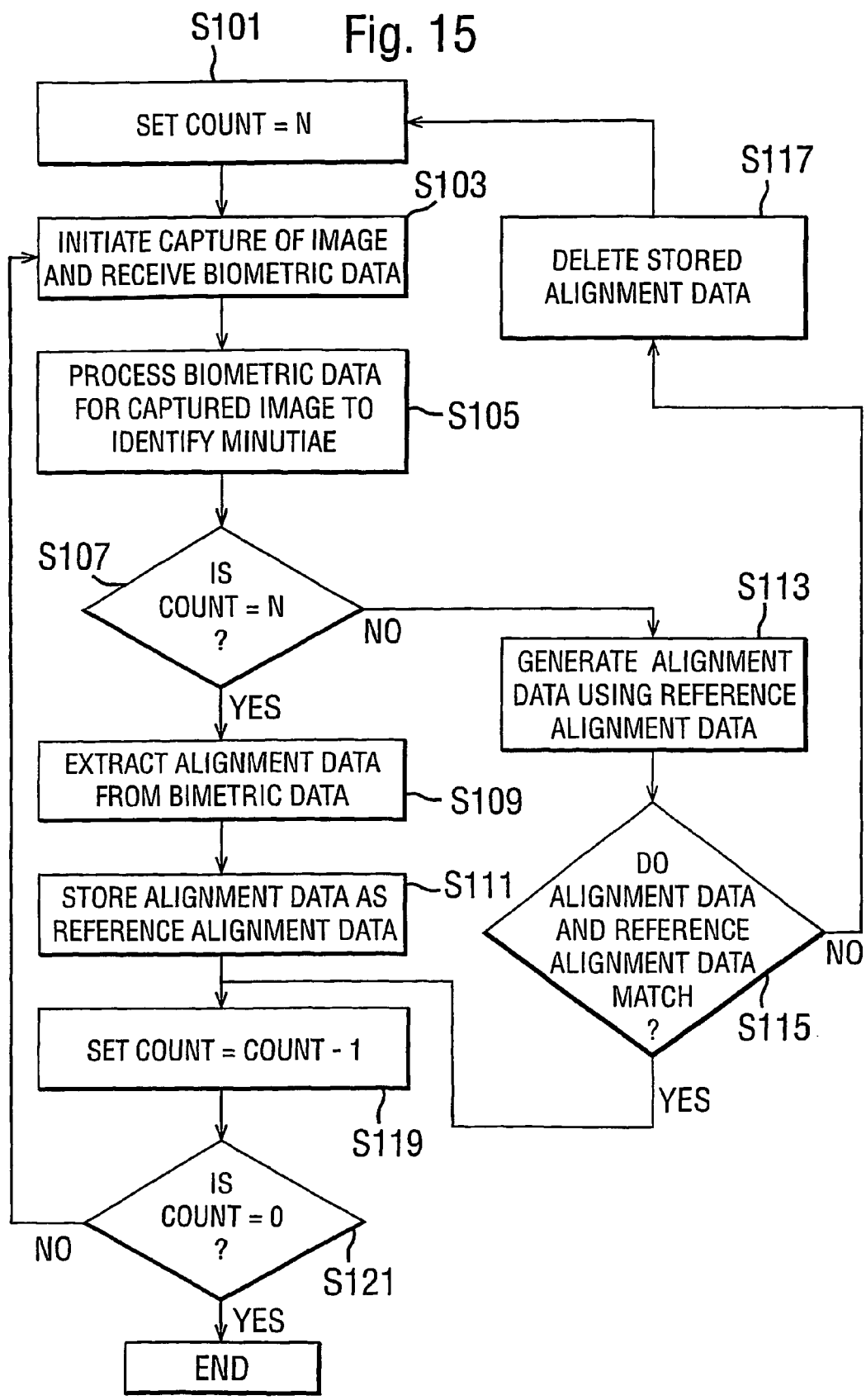
Figure 16:
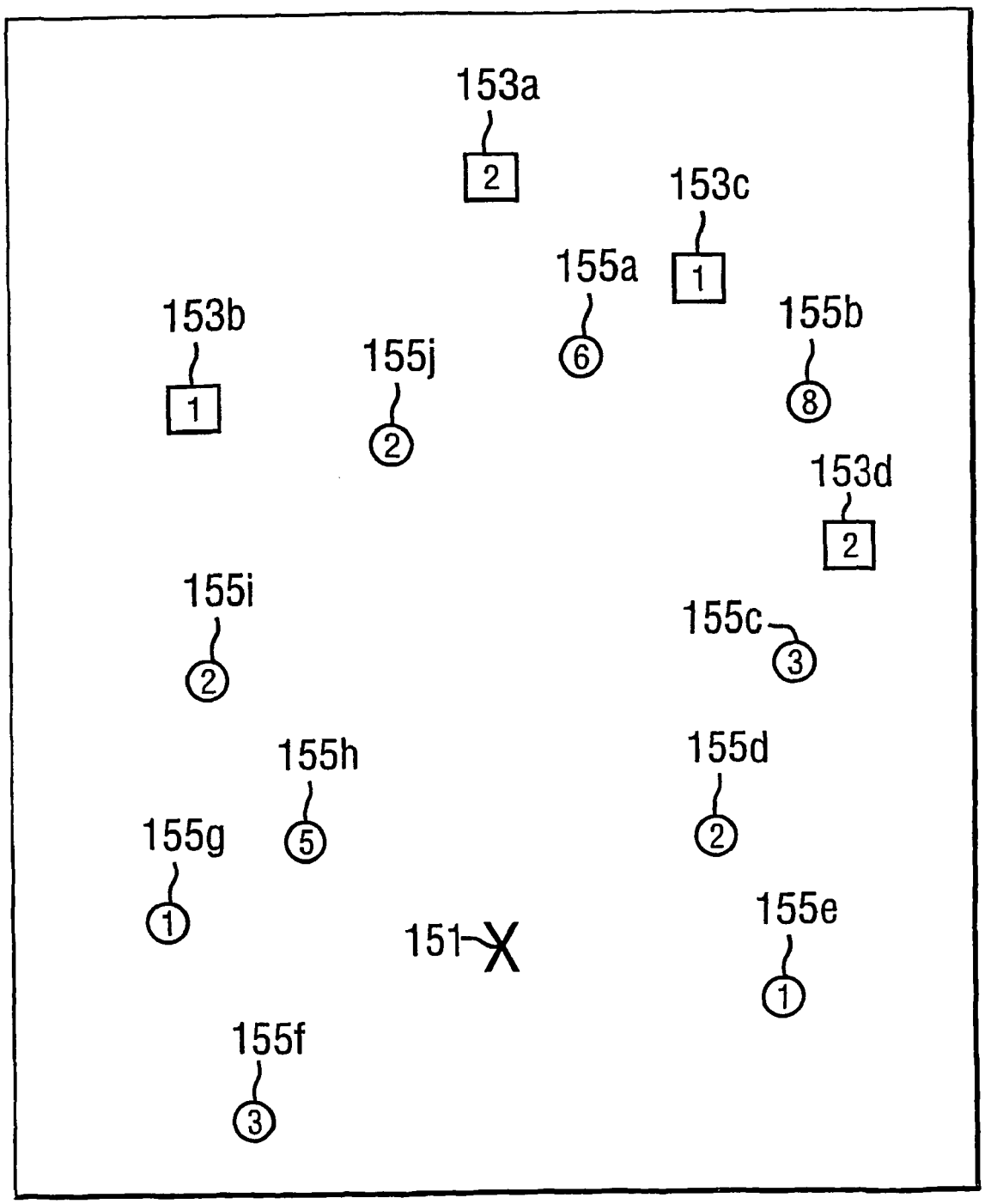
Figure 18A:
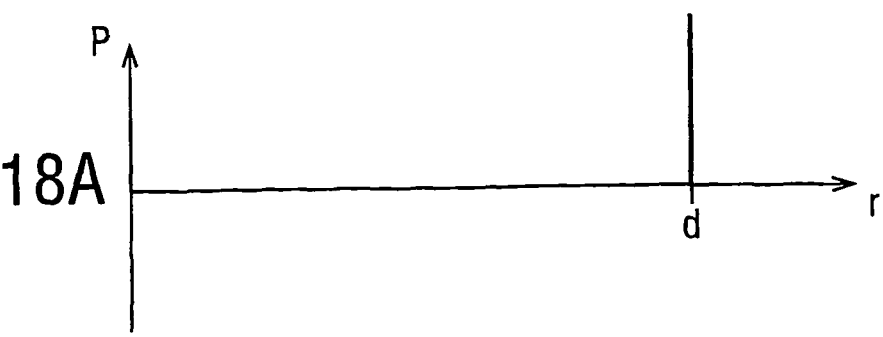
Figure 18B:
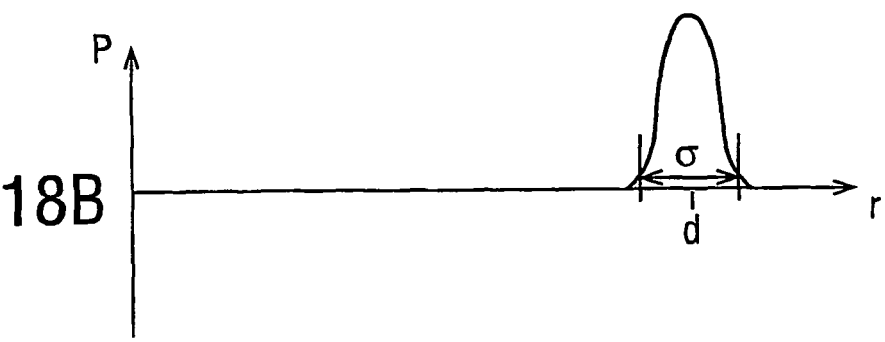
Figure 18C:
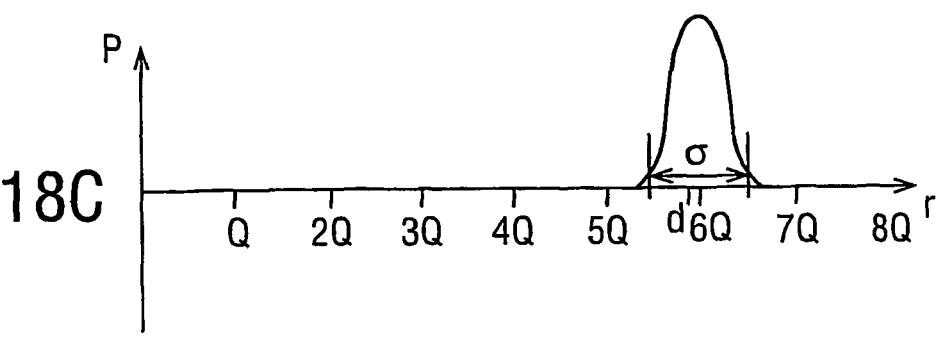
Figure 18D:
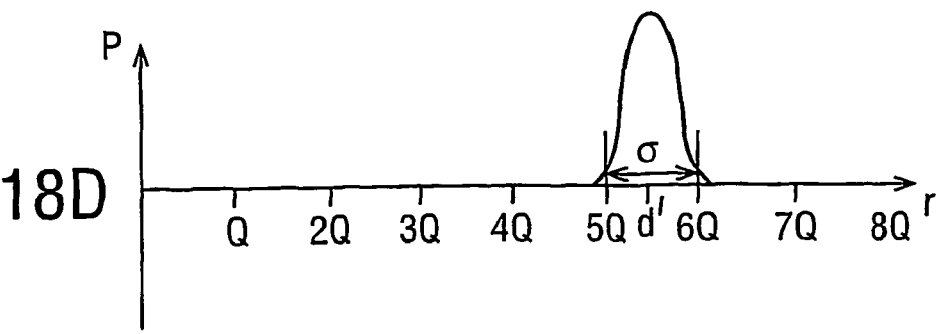
Figure 20:
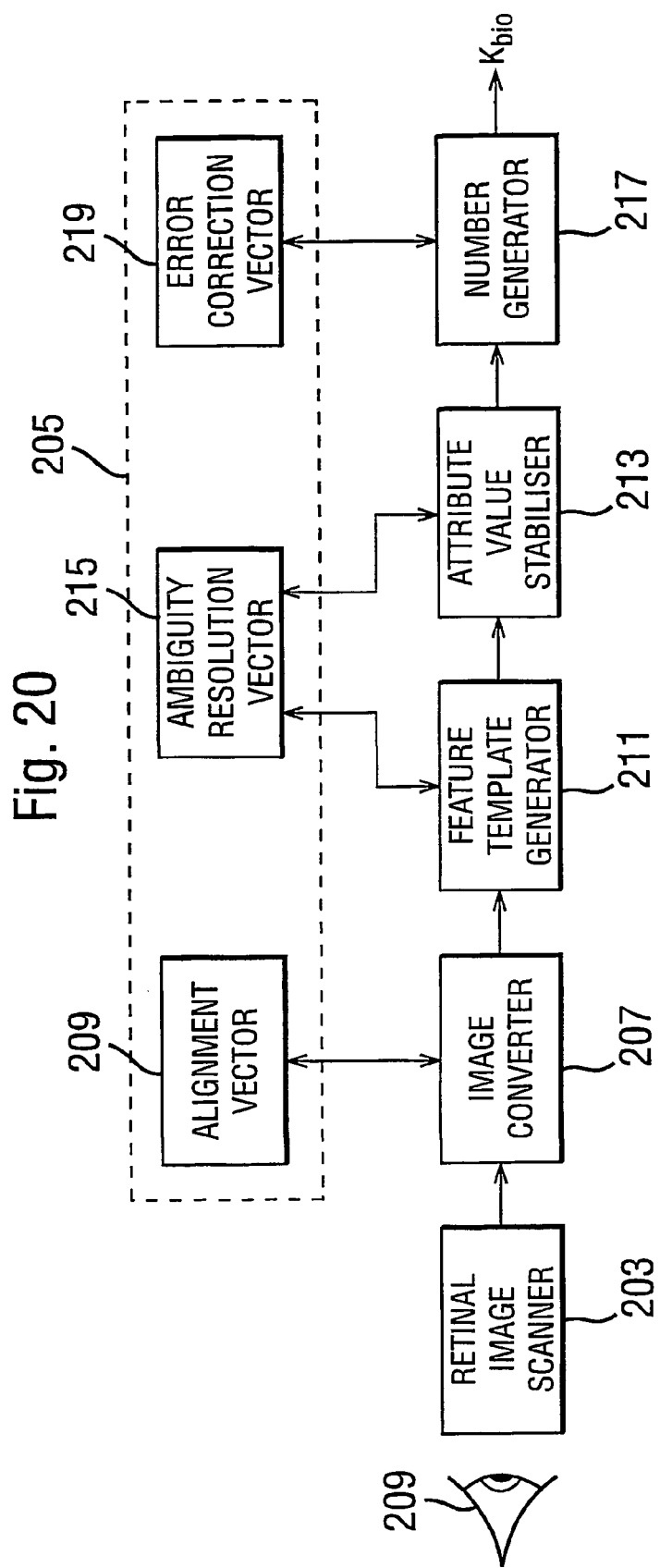
Figure 21A:
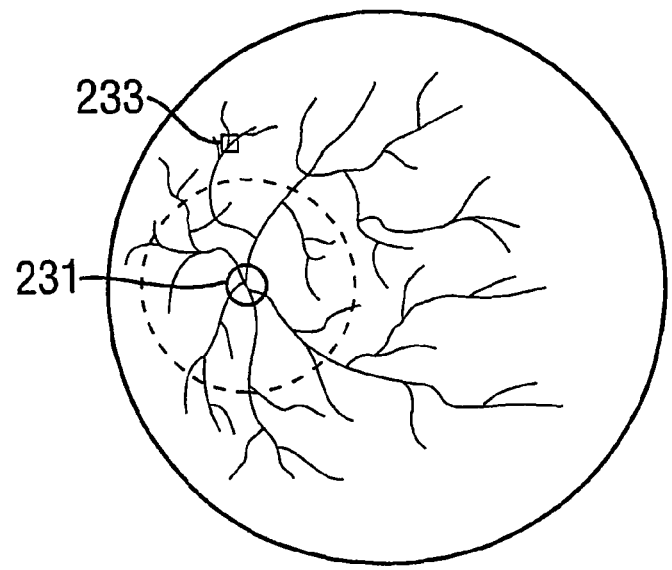
Figure 21B:
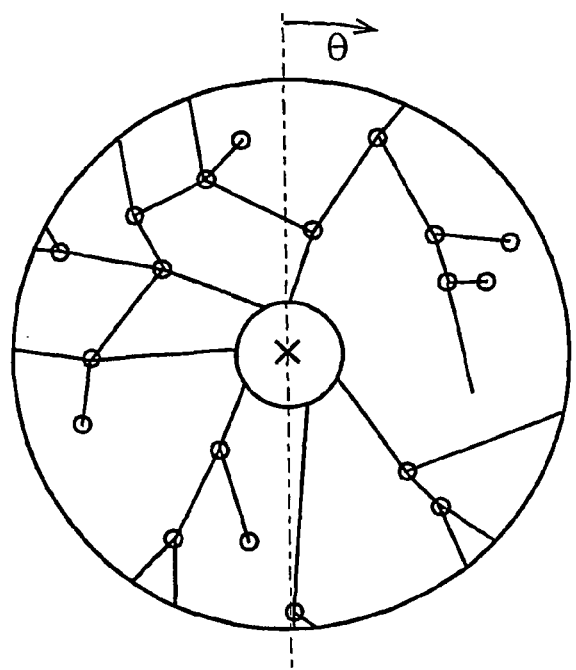
Figure 22:
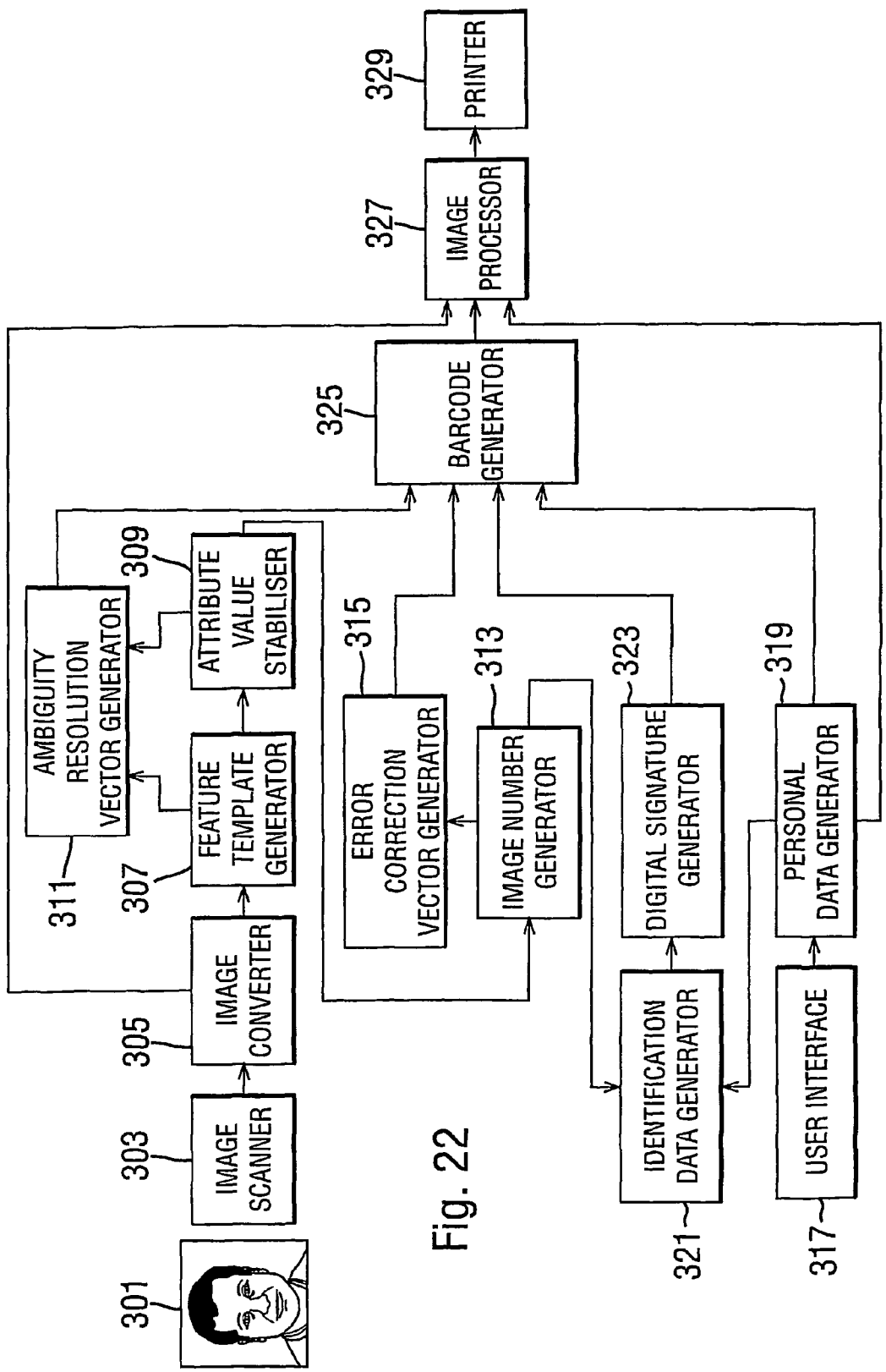
Figure 23:
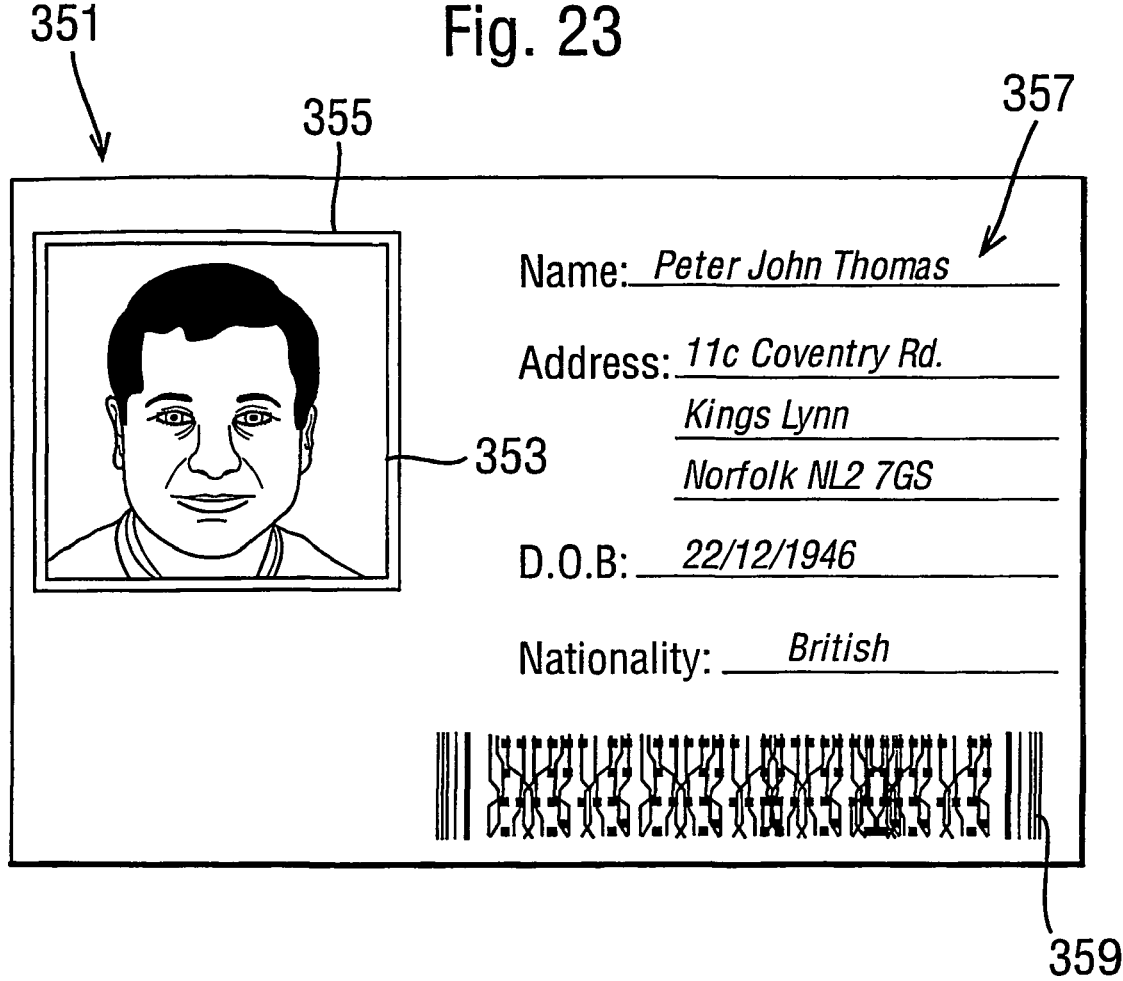
Figure 24:
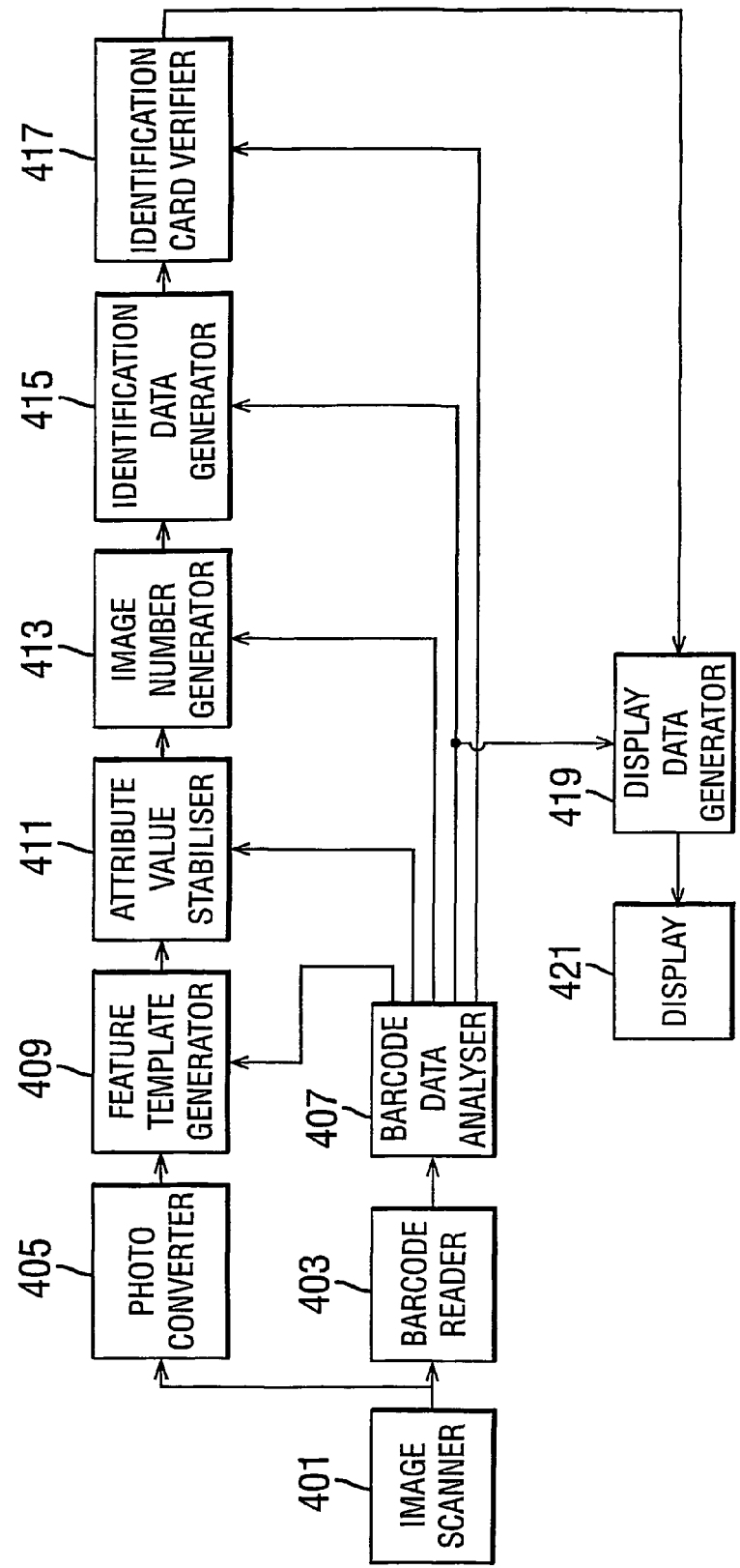
Figure 25:
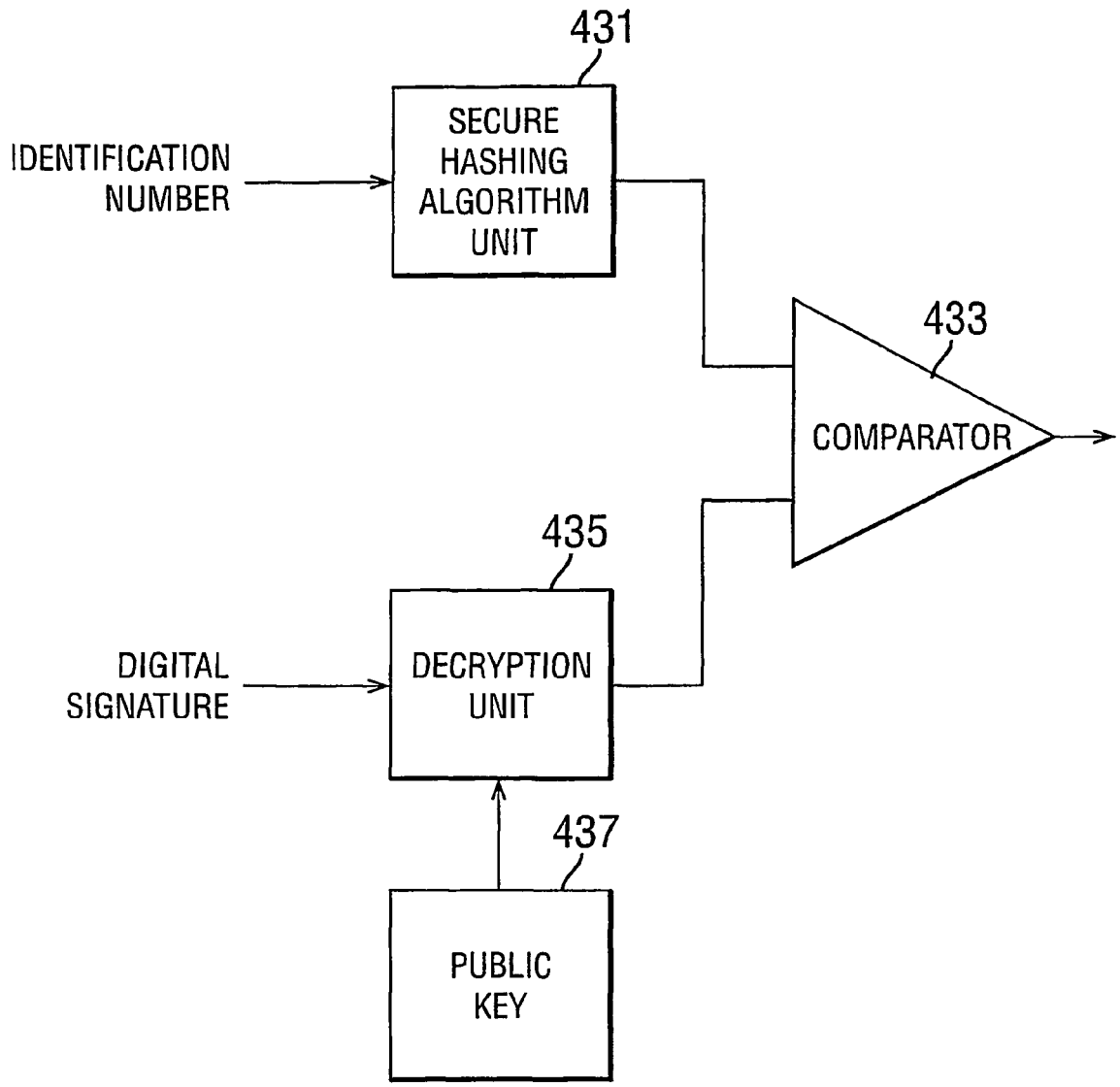
Figure 26:
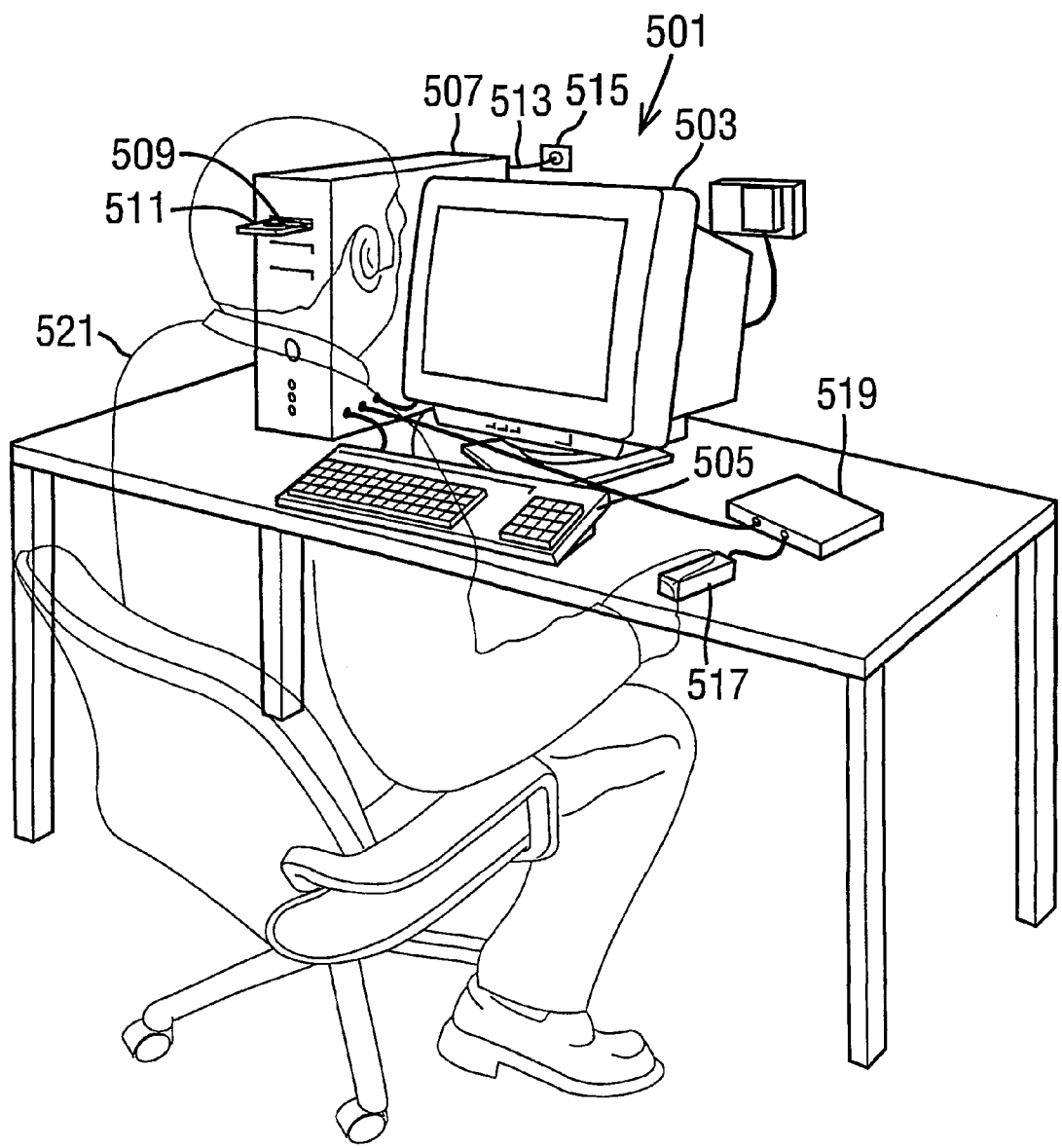
Figure 27:
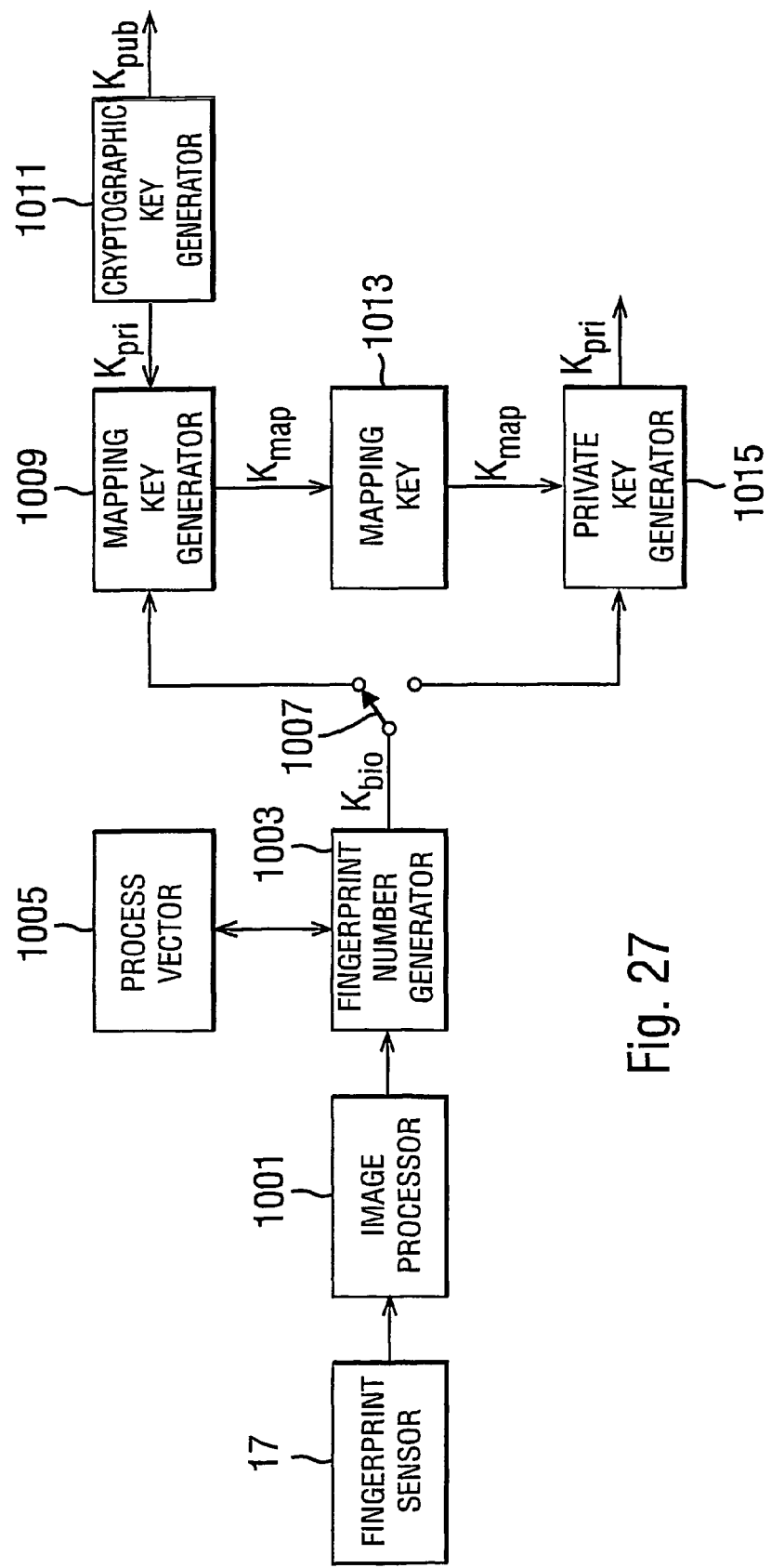

FIG. 7 schematically shows the main components of an attribute value stabiliser, an ambiguity resolution vector and a number generator of the biometric value generator illustrated in FIG. 1;

FIG. 8 is a flow chart showing operations performed by the attribute value stabiliser of the biometric value generator illustrated in FIG. 1 during an enrolment process;

FIG. 9A schematically shows a stabilised feature template generated during the enrolment process by the attribute value stabiliser of the biometric value generator illustrated in FIG. 1;

FIG. 9B schematically shows an offset vector generated during the enrolment process by the attribute value stabiliser of the biometric value generator illustrated in FIG. 1;

FIG. 10 is a flow chart showing operations performed by the number generator of the biometric value generator illustrated in FIG. 1 during an enrolment process;

FIG. 11 is a flow chart showing operations performed by the attribute value stabiliser of the biometric value generator illustrated in FIG. 1 during a biometric value regeneration process;

FIG. 12 is a flow chart showing operations performed by the number generator of the biometric value generator illustrated in FIG. 1 during a biometric value regeneration process;

FIG. 13 schematically shows a first alternative biometric value generator which generates a biometric value by processing image data corresponding to a fingerprint;

FIG. 14 schematically shows the main components of an image converter and a feature template generator of the biometric value generator illustrated in FIG. 13;

FIG. 15 is a flow chart showing operations performed by the image converter of the biometric value generator illustrated in FIG. 13 during an enrolment process;

FIG. 16 schematically shows a feature template generated by the feature template generator of the biometric value generator illustrated in FIG. 13;

FIG. 17 schematically shows the main components of an attribute value stabiliser and a number generator which form part of the biometric value generator illustrated in FIG. 13;

FIG. 18A is a graph schematically showing an idealised probability distribution function for the result of a measurement of a distance between an origin of a fingerprint and a minutia of a fingerprint;

FIG. 18B is a graph showing a typical real probability distribution function for the measured value of the distance indicated in FIG. 18A;

FIG. 18C is a graph showing the probability distribution function illustrated in FIG. 18B on a scale whose quantisation unit matches a confidence interval of the probability distribution function;

FIG. 18D is a graph showing the probability density function illustrated in FIG. 18B after being offset so that the peak value of the probability distribution function is positioned midway between neighbouring quantisation units of the scale illustrated in FIG. 18C;

FIG. 19 is a flow chart showing the operations performed by the biometric value generator illustrated in FIG. 13 during a biometric value regeneration process;

FIG. 20 schematically shows a second alternative biometric value generator which generates a biometric value by processing image data corresponding to a retina;

FIG. 21A schematically shows the image of a retina;

FIG. 21B schematically shows a converted image output by an image converter forming part of the biometric value generator illustrated in FIG. 20;

FIG. 22 schematically shows an identification card manufacturing system for producing an identification card including a photograph of an individual and a bar code storing authentication data;

FIG. 23 shows an identification card produced by the identification card manufacturing system illustrated in FIG. 22;

FIG. 24 schematically shows the main components of an identification card reader for reading an identification card produced by the identification card manufacturing system illustrated in FIG. 22;

FIG. 25 schematically shows the main components of an identification card verifier which forms part of the identification card reader illustrated in FIG. 24;

FIG. 26 shows a computer system including a fingerprint sensor and a cryptography unit; and FIG. 27 is a schematic block diagram showing how data from the fingerprint sensor is processed by the cryptography unit illustrated in FIG. 26 to generate a mapping key or a cryptographic key.

FIRST EMBODIMENT

System Overview

The biometric value generator of the first embodiment of the invention has two modes of operation. In the first mode of operation, the biometric value generator captures multiple images of the eye of an individual, extracts and processes image data corresponding to a sample iris portion in each capture and generates a biometric value $K_{bio}$. While processing the image data during enrolment, the biometric value generator generates a process vector storing process instructions containing information relating to the data processing operations performed. In the second mode of operation, the biometric value generator regenerates the biometric value $K_{bio}$ by capturing a new image of the eye and processing the image data in accordance with the process instructions to regenerate the biometric value $K_{bio}$.

As schematically shown in FIG. 1, image data corresponding to an eye 1 is generated by a camera 3 which forms part of the biometric value generator. In this embodiment, the camera 3 is a colour digital camera which outputs colour (RGB) image data. The image data is input to an image converter 7 which is associated with an alignment vector 9 that forms part of the process vector 5. The image converter 7 extracts and aligns the sample iris portion and also performs pre-processing operations on the extracted image portion to improve immunity to ambient light conditions. The image converter 7 outputs the sample iris portion to a feature template generator 11 which generates a feature template corresponding to the sample image portion.

A feature template is a collection of image artifacts within the image data, hereafter referred to as features. Each feature has a number of properties, hereafter called attributes, which each have an associated attribute value. The feature template generated by the feature template generator 11 is input to an attribute value stabiliser 13 which is associated with an ambiguity resolution vector 15 that forms part of the process vector 5. The attribute value stabiliser 13 processes the attribute values of the feature template to improve repeatability, and then outputs a stabilised feature template.

The stabilised feature template is input to a number generator 17 which is associated with an error correction vector 19 that forms part of the process vector 5. The number generator 17 processes the attribute values of the stabilised feature template to generate the biometric value $K_{bio}$.

The operation of the biometric value generator in the enrolment mode and the biometric value regeneration mode will now be described in more detail.

Enrolment Mode

During the enrolment process, the biometric value generator generates the process vector 5 in order to improve the repeatability of the biometric value $K_{bio}$.

Figure 2:
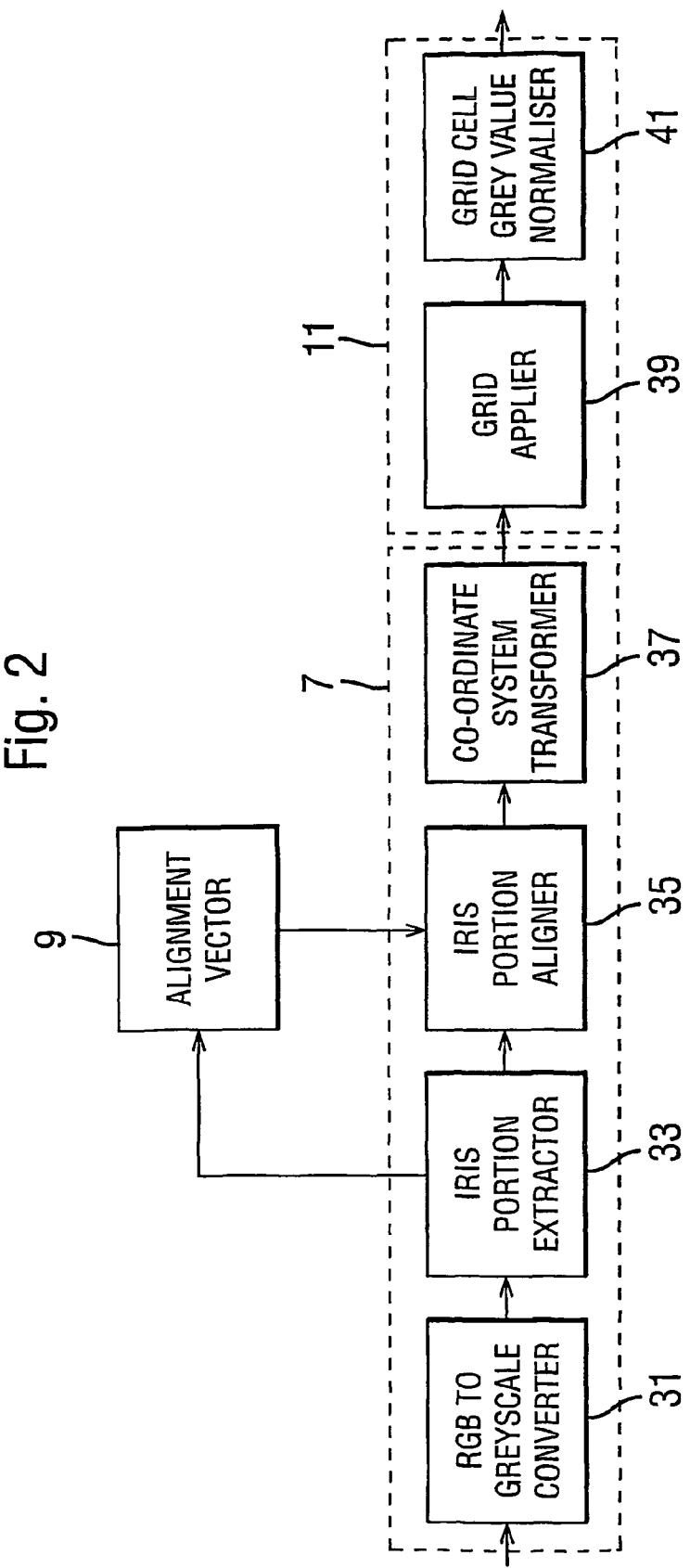

Each time that an image of the eye 1 is captured by the camera 3, the corresponding colour image data is input to the image converter 7. As shown in FIG. 2, the in the image converter 7 the colour image data received from the camera 3 is initially input to a RGB-to-grey scale converter which converts the colour image data into grey scale image data. In particular, for each pixel a grey level value is calculated by averaging the red, green and blue levels for that pixel.

Figure 3:
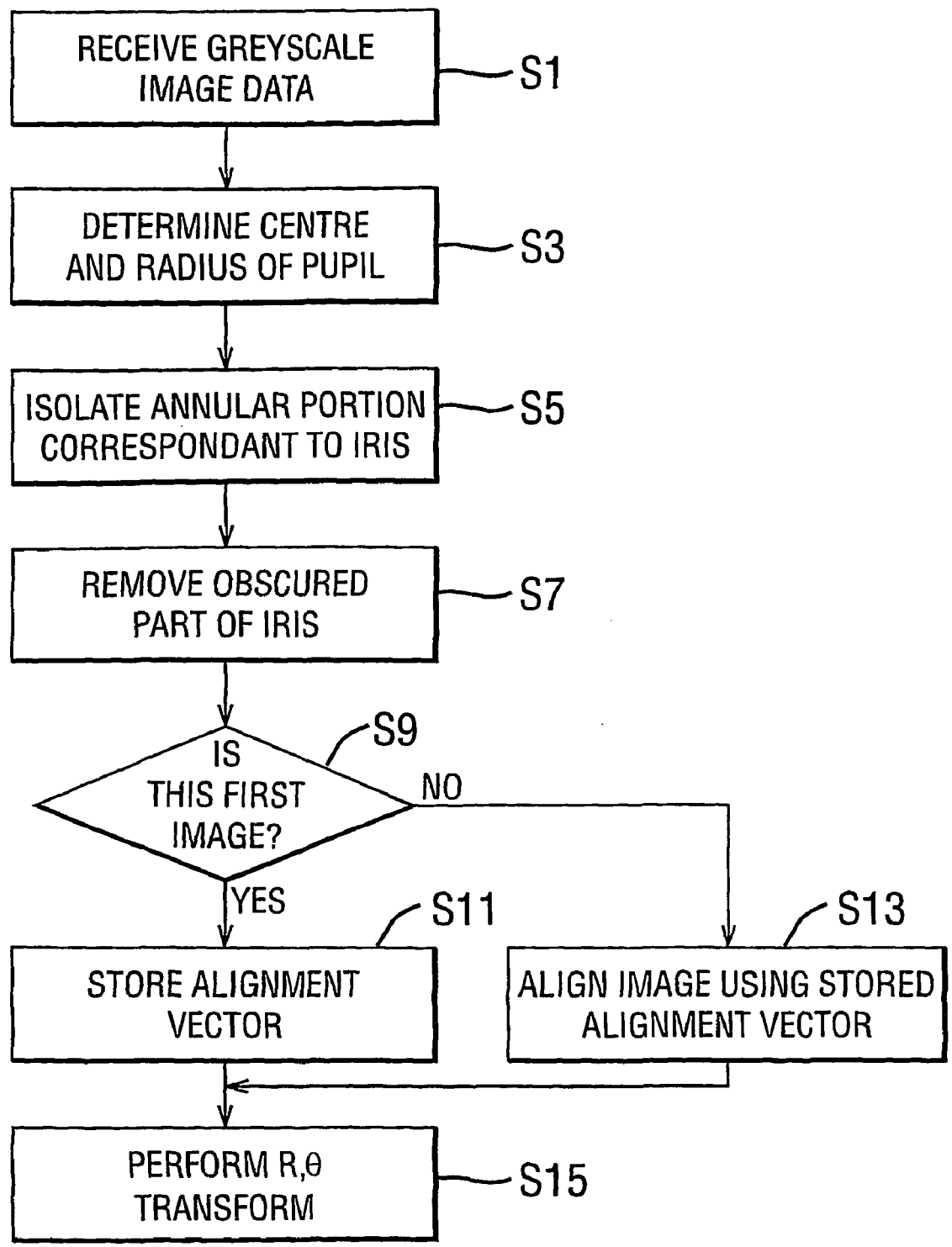
FIG. 3 is a flow chart showing operations performed by the image converter of the biometric value generator illustrated in FIG. 1.

The grey level image data is then input to an iris portion extractor 33 which extracts part of the image data corresponding to a sample portion of the iris and outputs the image data corresponding to the sample iris portion to an iris portion aligner 35. The operation of the iris portion extractor 33 and the iris portion aligner 35 will now be described with reference to FIG. 3.

Figure 4A:
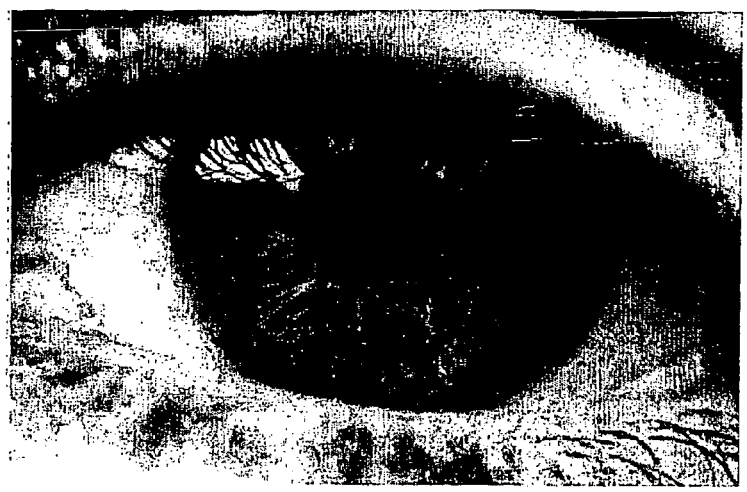
FIG. 4A shows a grey scale image of a human eye generated during operation of the biometric value generator illustrated in FIG. 1.

After receiving, in step S1, grey scale image data corresponding to a picture of the eye (as shown in FIG. 4A), the image portion extractor 33 determines, in step S3, the centre and the radius of the pupil contained in the image data. In this embodiment, the pupil is identified by first separating from the image data any pixels which are almost black. These almost black pixels do not just correspond to the pupil, but also correspond to eyelashes and other dark structure around the eye. Further, small light patches are generally present in the pupil due to reflected light.

The small light patches in the pupil are removed by performing a first conventional dilation operation in which each almost black pixel is replaced by a small black disc. Then, in order to remove the almost black pixels corresponding to features other than the pupil, a conventional erosion operation is performed in which a disc about half the size of the full pupil is centred in turn on each almost black pixel, and if the disc does not encompass only almost black pixels then the image pixel on which it is centred is removed. After the erosion operation, the remaining pixels form a circular shape which is centred on the centre of the pupil. The centre of the pupil is therefore found by finding the centre of gravity of the remaining pixels.

Once the centre of the pupil has been found, the pupil is expanded back to normal size by performing a second dilation operation which counteracts the changes in the pupil size caused by the first dilation operation and the erosion operation. The area of the pupil is then calculated to determine the radius. The inner radius of the iris is then set equal to the radius of the pupil and the outer radius of the iris is determined by a user as a multiple of the radius of the iris.

Figure 4B:
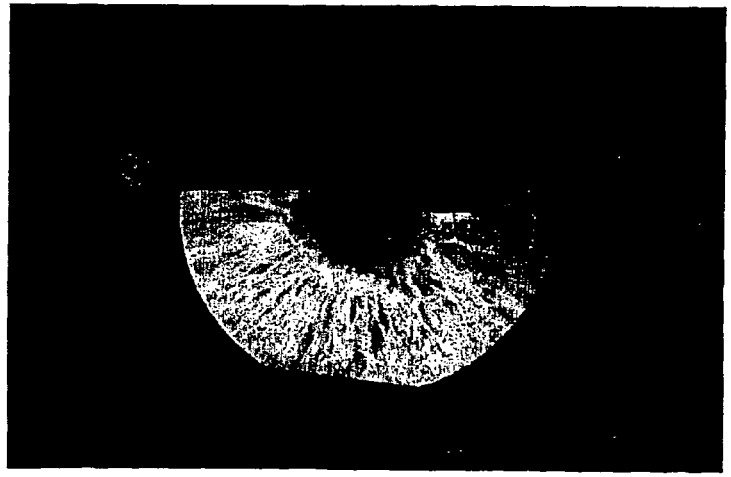
FIG. 4B shows a sample iris portion extracted from the image illustrated in FIG. 4A.

The image converter 7 then isolates, in step S5, the annular portion centred on the centre of the pupil and having inner and outer radii equal to the determined inner and outer radii of the iris. The isolated annular portion therefore generally corresponds to the iris, although parts of the iris will be obscured by eyelids, eyelashes, reflected light and the like. In this embodiment, these obscured parts are removed, in step S7, by a user to leave a sample image portion as shown in FIG. 4B.

The iris portion extractor 33 then checks, in step S9, if this is the first captured image. If it is the first captured image, then the iris portion extractor 33 stores, in step S11, the image data for the obscured part of the iris as the alignment vector 9. Although the image data for the obscured part of the iris is not suitable for use in generating the biometric value $K_{bio}$, it can be used in a pattern recognition operation to align subsequent images of the iris. If it is found in step S9 that it is not the first captured image, then the iris portion extractor 33 outputs the sample iris portion to an iris portion aligner 35 which, using the alignment vector 9, aligns the R and θ axes and ensures that the same sample iris portion is being used.

Figure 4C:
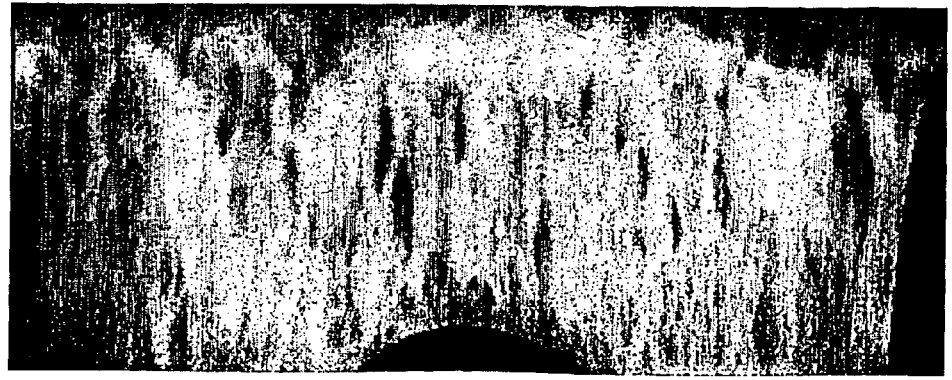
FIG. 4C shows the sample iris portion illustrated in FIG. 4B after transformation from polar to Cartesian coordinates.

The sample iris portion is then input to a coordinate system transformer 37 which converts the R,θ data into X,Y data to give a rectangular array of image data as shown in FIG. 4C. As can be seen in FIG. 4C, the transformed sample iris portion does not form a perfect rectangle because parts of the image data were previously removed as they were obscured.

In this embodiment, the removal of the obscured pacts of the iris and the alignment of sample iris portions is performed manually using the MATLAB software package.

The transformed image data is input to the feature template generator 11. In this embodiment, the feature template generator 11 applies a grid structure to the transformed image data and each cell of the grid forms a feature, and the normalised average grey level of each cell of the grid is the attribute whose value is measured. As shown in FIG. 2, the feature template generator 11 includes a grid applier 39, which applies the grid to the transformed image data, and a grid cell grey value normaliser 41 which generates the normalised grey value for each cell of the grid. The operation of the feature template generator will be described in more detail with reference to FIG. 5.

Figure 5:
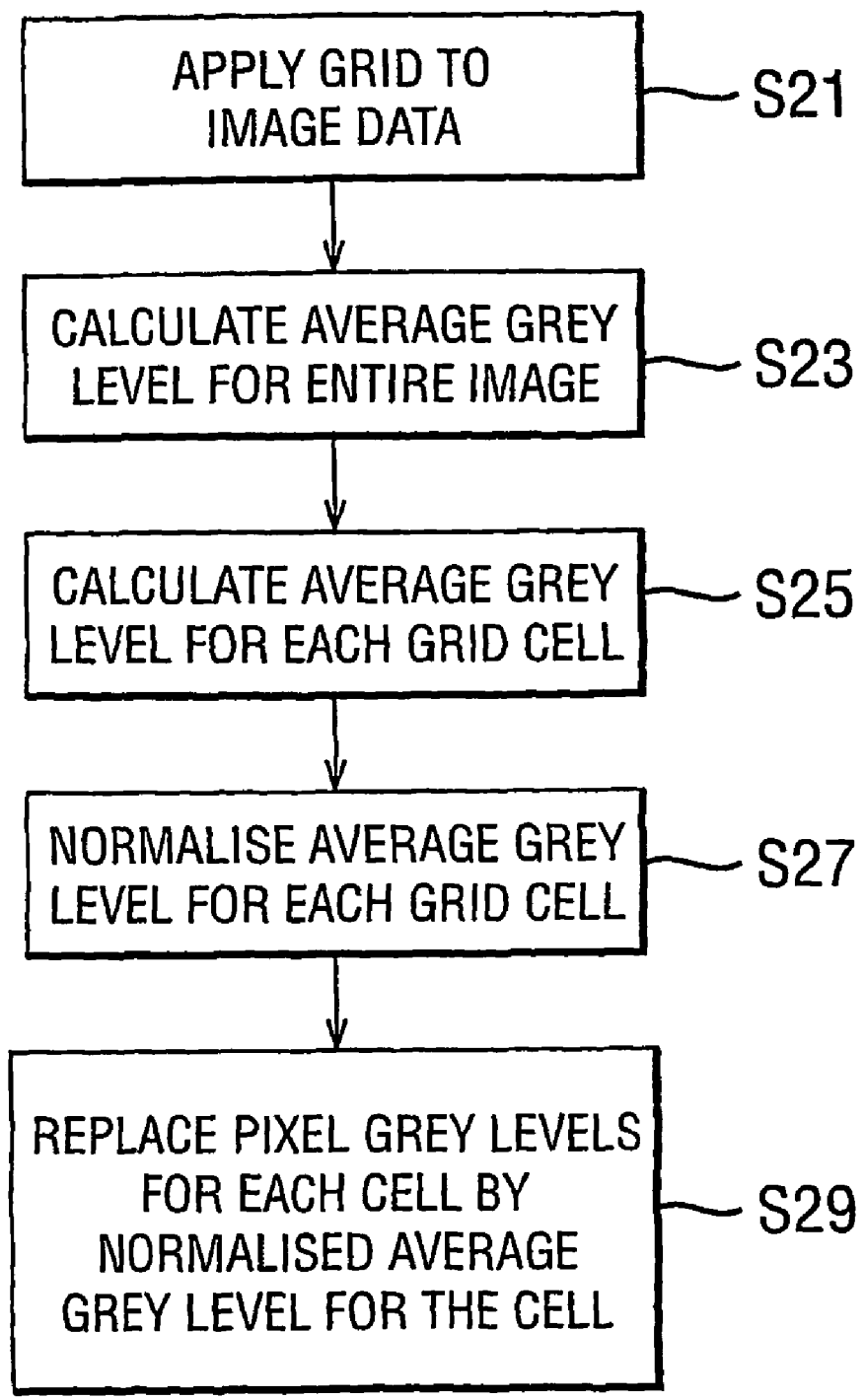
FIG. 5 is a flow chart showing operations performed by the feature template generator of the biometric value generator illustrated in FIG. 1.

As shown in FIG. 5, the grid applier 39 applies, in step S21, the grid to the image data. In this embodiment, the transformed image data is a 450 by 180 array of pixels and the grid applier 39 applies a grid having 18 rows and 45 columns such that each grid cell encompasses a ten-by-ten block of pixels. The grid cell grey value normaliser 41 then calculates, in step S23, the total average grey level $G_{image}$ for the entire image by finding the mean grey level for all the pixels of the transformed image data. The grid cell grey value normaliser 41 then calculates, in step S25, an average grey level for each grid cell by calculating the mean grey level $G_{cell}$ for the 100 pixels forming the cell, and normalises, in step S27, the average grey level for each grid cell by dividing the mean grey level $G_{cell}$ for the grid cell by the average grey level $G_{image}$ for the image. The grid cell grey value normaliser 41 then replaces, in step S29, the one hundred individual pixel grey levels in each cell by the normalised average grey level for the cell.

The feature template therefore corresponds to a 45 by 18 grid with each cell in the grid having an associated grey level.

During enrolment, multiple feature templates, each corresponding to a different image capture by the camera 3, are generated by the feature template generator 11 and are input to the attribute value stabiliser 13. As shown in FIG. 7, the attribute value stabiliser includes an attribute quantiser 51, which re-scales the normalised grey level values, an attribute value adjuster 55, which adjusts each re-scaled normalised grey level to be positioned midway between two neighbouring integer values, and an attribute value truncator, which truncates the adjusted normalised grey level value to an integer value. The operation of the attribute value stabiliser 13 will now be described in more detail with reference to FIG. 8.

Figure 6:
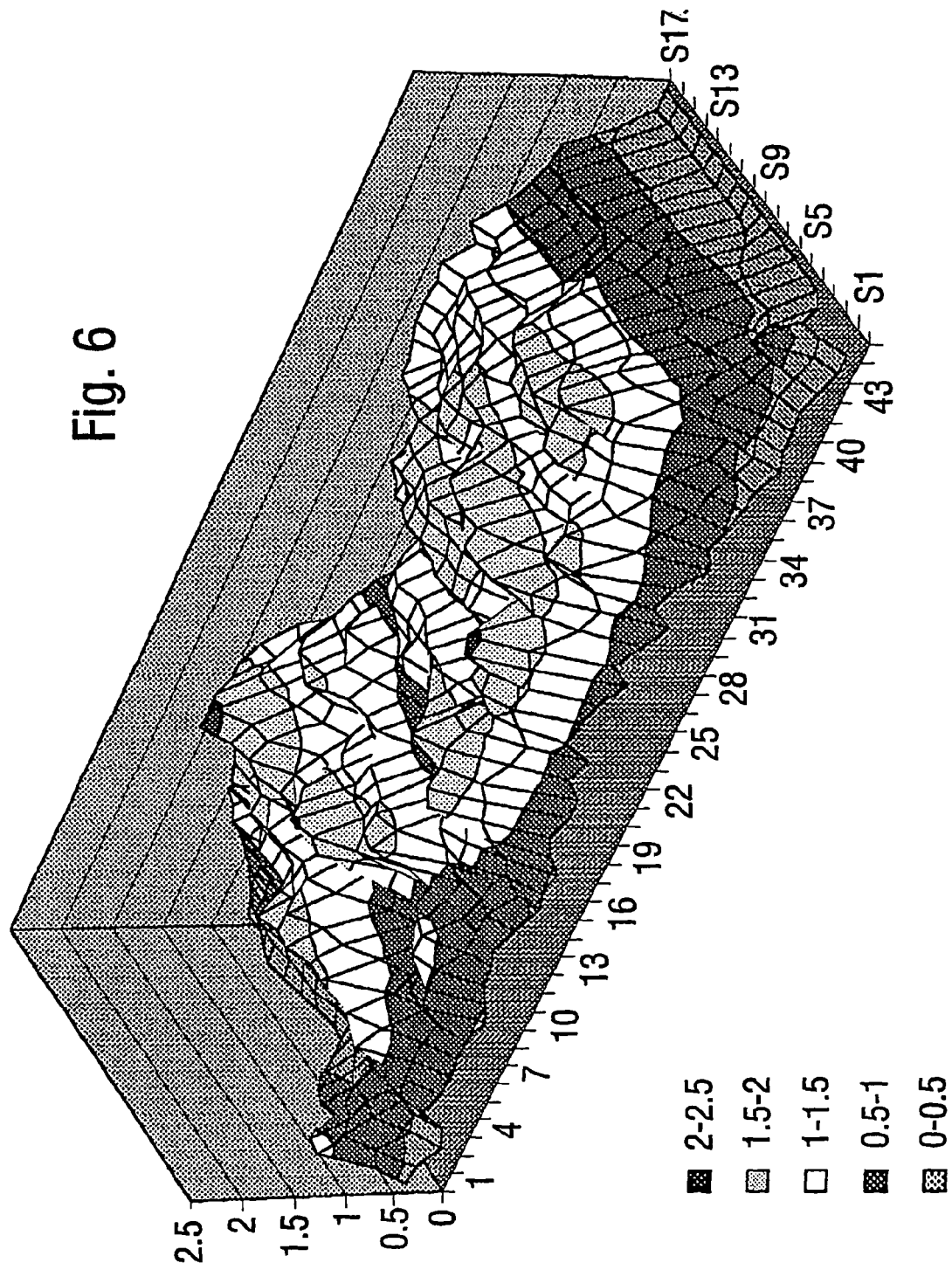
FIG. 6 is a plot schematically illustrating a feature template generated by the feature template generator of the biometric value generator illustrated in FIG. 1.

After receiving, in step S41, multiple feature templates, the attribute quantiser 51 calculates, in step S43, a mean feature template by calculating the mean normalised grey level value for each grid cell. A typical mean feature template is schematically illustrated in FIG. 6. The attribute quantiser 51 then calculates, in step S45, the median value of the normalised grey levels for the mean feature template, i.e. half the cells of the mean feature template have a normalised grey level above the median value and half the cells of the mean feature template have a normalised grey level below the median value.

The attribute quantiser 51 then calculates, in step S47, a unit value using the calculated median value. In this embodiment, the unit size is set to half the calculated median value. The attribute quantiser 51 then re-scales, in step S49, the average grey level for each cell as a multiple of the unit value to form a quantised feature template, and stores the unit value as the unit vector 53. In this embodiment, the same unit value is applied to each normalised grey level.

The quantised feature template is then input to the attribute value adjuster 55. In this embodiment, the attribute value adjuster calculates, in step S51, an offset value for each cell which moves the average grey level to the mid-point between neighbouring integer multiples of the unit value. In particular, the attribute value adjuster 55 calculates the offset value of a quantised grey level value by truncating the quantised grey level value to an integer value, adding 0.5 and then subtracting the original quantised grey level value. For example, if the quantised grey level value for a cell is 1.83, the attribute value adjuster 55 calculates an offset value of −0.33.

The attribute value adjuster 55 then adjusts, in step S53, each quantised grey level value by adding the corresponding calculated offset value, and stores the offset values for each cell as an offset vector 57 which forms part of the ambiguity resolution vector 15. In this way, an adjusted feature template is generated. The adjusted feature template is then input to the attribute value truncator 59 which generates, in step S55, a stabilised feature template by truncating each adjusted average grey level to an integer value in order to generate a stabilised feature template. Thus, if the adjusted average grey level value is 1.5, then the truncated average grey level value is 1.

FIG. 9A shows an example of a stabilised feature template generated by the attribute value stabiliser 13 corresponding to the mean feature template shown in FIG. 6. The stabilised feature template is formed by a 45 by 18 array of cells with each cell having an associated grey level value. There are therefore a total of 810 grey level values. FIG. 9B schematically shows the offset vector 57 associated with the stabilised feature template illustrated in FIG. 9A.

For such a large number of values, even with the described data stabilisation the likelihood of exactly repeating all of the values is too low for a reliable number generator. However, in this embodiment only 162 of these values are used to generate the biometric value $K_{bio}$, with the remaining 648 values being used to perform error correction. This significantly improves the reliability of the number generation.

In this embodiment the biometric number $K_{bio}$ is generated using the average grey levels of the cells in every fifth column (i.e. the first column, the sixth column, the eleventh column, . . . ). The values within these columns will hereafter be referred to as data values, whereas the values in the remaining columns will be referred to as redundant values. Each data value is associated with the four redundant values which immediately follow the data value in the same row.

Error correction data is generated by applying a bitwise exclusive-OR operation between each redundant value and the corresponding data value to generate an error correction value. A typical sequence of data value followed by four redundant values would be as follows: 10;11;01;01;10. The corresponding four error correction values are: 01;11;11;00. It will be appreciated that these error correction values, on their own, give no information about the associated data value.

As shown in FIG. 7, the number generator 17 includes an error corrector 61 and a value concatenator 65. The operation of the number generator 17 during the enrolment process will now be described with reference to FIG. 10. The error corrector 61 receives, in step S61, the stabilised feature template from the attribute value stabiliser 13. The error corrector 61 then generates, in step S63, the error correction values and stores, in step S65, the error correction values as the error correction vector 63. The feature template is then input to the value concatenator 65 which generates, in step S67, the biometric value $K_{bio}$ by concatenating all the data values of the biometric template in a predetermined order.

As described above, during an enrolment process an alignment vector 9, an ambiguity resolution vector 15 (including a unit vector 53 and an offset vector 57), and an error correction vector 19 are generated. After the enrolment process, if the same iris is imaged by the camera 3, then the process vector 5 increases the likelihood that the same biometric value $K_{bio}$ is generated.

Number Regeneration Mode

In the number regeneration mode, after capturing an image of the eye 1 the image converter 7 extracts the same portion of the iris as was used during the enrolment process and aligns the extracted image portion using the alignment vector 9. The feature template generator 11 then applies the same grid structure as used in the enrolment process and generates normalised average grey levels for each cell of the grid.

The operation of the attribute value stabiliser 13 during a number generation process will now be described in more detail with reference to FIG. 11. When the attribute value stabiliser 13 receives, in step S71, a feature template from the feature template generator 11, the attribute value stabiliser 13 obtains the unit value from the unit vector 53 and scales, in step S73, the normalised average grey level values for each cell using the unit value.

The scaled feature template is then input to the attribute value adjuster 55 which obtains for each cell the corresponding offset value from the offset vector 57 and adjusts, in step S75, the quantised value for the normalised grey level of a grid cell by adding the stored offset value. Although the adjusted average grey level value is not necessarily at the midpoint between two neighbouring integer values, the enrolment process is designed to ensure that the probability function for the position of the adjusted average grey level value is centred at the midpoint between two neighbouring integer values. The reason for doing this is that as the average grey level value gets closer to an integer value, the likelihood that the normalised grey level value is truncated to the wrong level increases. The sensitivity of the generated number to variation in the normalised grey level is therefore high. The attribute value stabiliser 13 therefore analyses how close a normalised grey level value is to an integer value, and calculates an offset value to move the normalised grey level value to a point in the middle of the numerical range between two integer values. The use of the offset vector 57 therefore improves the stability of the attribute values from feature template to feature template.

The adjusted feature template is input to the attribute value truncator 59 which generates, in step S77, the stabilised feature template by truncating the average grey level value for each cell to an integer value.

The operation of the number generator 17 will now be described with reference to FIG. 12. As shown, upon receiving, in step S81, the stabilised feature template from the attribute value stabiliser 13, the error corrector 61 corrects, in step S83, the attribute values used in the error correction data stored in the error correction vector 63 to generate a corresponding correction value. In particular, each of the data values (i.e. the average grey level values in each of the first, sixth, eleventh, . . . columns) is unchanged whereas a bitwise exclusive-OR operation is performed on each of the redundant values and the corresponding error correction value stored in the error correction vector 63. In this way, each data value should be identical to the four corresponding redundant values. If this is not the case, then a voting operation is performed on the data value and the associated four correction values and the data value is set to the average grey level value which appears most frequently.

The corrected feature template is then input to the value concatenator 65 which generates, in step S85, the biometric value by concatenating the data values in the predetermined order.

In an experimental test, 803 of the 810 average grey level values of the stabilised feature template were successfully reproduced when using the offset vector, which after the error correction operation corresponded to a 99.9% repeatability of the biometric value $K_{bio}$. However, when no offset vector was used, only 591 of the average grey level values were reproduced which, even with the error correction, only gave an extremely low repeatability (about $1.5 \times 10^{-9}$%). It can therefore be seen that by systematically addressing possible sources of ambiguity in the feature template, the repeatability of the number is significantly improved.

Second Embodiment

In the first embodiment, a biometric value $K_{bio}$ was derived from an image of an iris. A second embodiment will now be described in which the biometric value $K_{bio}$ is derived from the image of a fingerprint.

A fingerprint image consists of a pattern of ridges with the smooth flow of the ridges being interrupted by discontinuities referred to as minutiae. These minutiae have been codified into different types which are generally known as Galton features. The positions of the minutiae in a fingerprint vary little over an individual's life, apart from scarring or the like, and are sufficiently random that they have been used for many years to identify an individual. Table 1 names and gives a brief description of the eight categories used in this embodiment.

TABLE 1

Categories of fingerprint minutiae.

| CATEGORY NUMBER | NAME | BRIEF DESCRIPTION |
|---|---|---|
| 1 | Ridge Ending | The point at which a ridge stops |
| 2 | Bifurcation | The point at which one ridge divides into two |
| 3 | Dot | Very small ridge |
| 4 | Island | Ridge slightly longer than a dot located between two temporarily divided ridges |
| 5 | Pond | Empty space between two temporarily divergent ridges |
| 6 | Spur | A notch protruding from a ridge |
| 7 | Bridge | Small ridge connecting two longer adjacent ridges |
| 8 | Crossover | Two ridges which cross each other |

As shown in FIG. 13, in this embodiment, an image of a fingerprint is taken by a fingerprint sensor 103 which outputs corresponding image data which is processed, using a process data 105, to generate the biometric value $K_{bio}$. As shown, the image data is input to an image converter 107, which aligns the image using an alignment vector 109 generated during an enrolment process. The aligned image is input to a feature template generator 111 which generates a feature template in accordance with the minutiae within the image data. The feature template generator 11 uses part of an ambiguity resolution vector 115 to resolve possible ambiguities in the generation of the feature template. The generated feature template is then input to an attribute value stabiliser 113 which generates a stabilised feature template using data within the ambiguity resolution vector 115. The stabilised feature template is then input to a number generator 117 which generates the biometric value $K_{bio}$ using an error correction vector 119 forming part of the process vector.

As described above, much of the processing performed in this embodiment is analogous to processing performed in the first embodiment. Apart from the source of the image data, perhaps the biggest difference is that in this embodiment the feature template is obtained by identifying inherent features of the image data, whereas in the first embodiment a grid was applied to the image data. In order to identify these features, measurements of the information content of the aligned image are made and compared with predetermined conditions associated with each feature. There is, therefore, a possibility of ambiguity in the identification of the features if a measurement value used during identification falls close to the boundary of one of the conditions for a feature.

The main components of the image converter 107 are shown in FIG. 14. As shown, the image data from the fingerprint sensor 103 is input to a minutiae identifier 131 which identifies the type and position of a plurality of minutiae within the image data. This minutiae data is input to an image aligner 133 which aligns the positions of the identified minutiae using an alignment vector 109 generated during the enrolment process.

FIG. 15 shows the main operations performed by the image converter 107 during the enrolment process.

Firstly, a count value is set, in step S101, to N where N is the number of images which are to be processed in order to generate the process vector 105. The image converter 107 then initiates, in step S103, capture of an image by the fingerprint sensor 103 and receives the image data for the captured image. In this embodiment, the image data received from the fingerprint sensor 103 is first thinned to provide more distinct ridges. Such a thinning operation is conventional in automatic fingerprint processing systems.

The minutiae identifier 131 then processes, in step S105, the image data using conventional pattern recognition software to locate minutiae in the eight categories identified in Table 1. The minutiae identifier 131 also locates, again using conventional pattern recognition software, the point of maximum ridge curvature which acts as an origin from which the positions of all the other identified minutiae are measured.

The positions and categories for the identified minutiae and the position of the origin is then input to the image aligner 133 which checks, in step S107, the count value. If the count value is equal to N, the image aligner 133 identifies, in step S29, four prominent minutiae, usually ridge endings or bifurcations, to act as alignment minutiae. In particular, a principal minutia is identified by looking in a predetermined region of the image and three secondary minutiae are identified by looking in three different regions of the image spaced away from each other and the principal minutia.

FIG. 16 schematically shows a map of the image data in which the origin 151 has been represented by X, each alignment minutia 153 has been represented by a square enclosing the category number for the minutia, and each of the remaining minutiae, which will be referred to as measurement minutiae 155, have been represented by a circle enclosing the category number for the minutia.

A principal axis is formed by a line connecting the origin 151 and the principal minutia 153a. The distance between the origin 151 and the principal minutia 153a is used as a normalisation distance R, and the positions of the other alignment minutiae 153 and the measurement minutiae 155 are then determined using polar coordinates $(r,\theta)$, where for each minutia r is the distance of the minutia from the origin 151 normalised by the normalisation distance R, and $\theta$ is the angle between the principal axis and a straight line extending from the origin 151 to the minutia.

The image aligner 133 then stores, in step S111, the absolute positions and categorisations of the alignment minutiae 153 for use as reference alignment data. The purpose of storing the absolute positions and categorisations of the alignment minutiae 153 is to facilitate the identification of the corresponding minutiae in subsequent fingerprint images.

If in step S107 the count value is not equal to N, then this indicates that reference alignment data has already been stored, and alignment data for the new feature template is generated, in step S113, using the reference alignment data. In particular, minutiae are identified which are in the vicinity of the absolute position stored in the reference alignment data and whose category matches the category of the corresponding minutiae of the reference alignment data. This relies upon the fact that there is a natural orientation in which a user places a finger on the fingerprint sensor and therefore the positions of the alignment minutiae does not vary to a large extent from one image scan to the next.

The image aligner 133 then compares, in step S115, the alignment data generated for the new feature template with the reference alignment data. This comparison involves comparing the $(r,\theta)$ coordinate of all but one of the secondary minutiae for the new alignment data with the corresponding secondary minutiae of the reference alignment data to identify image distortion, which may be caused by a change in orientation of the finger between different scans of the fingerprint. A transform function is then determined based on these differences to transform the r and $\theta$ values of the new secondary minutiae so that they align with the corresponding secondary minutiae of the reference alignment data. Finally, the determined transform function is applied to the (r,θ) coordinate of the last remaining secondary minutia and the transformed coordinates are compared with the (r,θ) coordinates for the corresponding secondary minutia of the reference alignment data to check whether they coincide. In particular, if the normalised distance between the transformed (r,θ) coordinates for the last remaining secondary minutia and the (r,θ) coordinates for the corresponding referenced secondary minutia exceeds a preset amount, this indicates that the stored reference alignment data may be unreliable and therefore the routine proceeds to delete, in step S117, the stored reference alignment data and returns to step S101 in which the count value is reset to N, otherwise the determined transform is applied to the (r,θ) coordinates of the measurement minutia 155 to generate a minutiae map which is stored for further processing.

After either the alignment data has been stored as the reference alignment data (step S111) or the alignment data has been found to match the stored reference alignment data (step S115), the image aligner 133 decrements, in step S119, the count value by 1 and then checks, in step S121, if the count value is equal to zero. If the count value is not equal to zero, then the routine returns to step S103 where a new image is captured. If the count value is equal to zero, then this indicates that N minutiae maps have successfully been stored and the analysis of the measurement minutiae 155 commences.

The N minutiae maps stored by the image aligner 133 are input to the feature template generator 111 where they are first input to a minutiae indexer 135 which indexes the minutiae in each of the N minutiae maps. In particular, for each minutiae map, the minutiae are primarily indexed in the order of increasing value of θ. If two or more minutiae have the same value of θ, then these two or more minutiae are indexed in increasing value of R.

The indexed minutiae data is then input to an unstable minutiae excluder 137 which compares the minutiae in each of the minutiae maps and excludes any minutiae with a low repeatability. In particular, minutiae which do not appear in all of the N minutiae maps and minutiae which have been classified in more than two categories throughout the set of N minutiae maps are excluded. An exclusion vector 139 giving details of the excluded minutiae is then generated and stored as part of the ambiguity resolution vector 115. The exclusion vector 139 lists the (r,θ) coordinates for the excluded minutiae so that, when processing subsequent fingerprint scans, minutiae located at these coordinates are ignored.

A problem which can occur when indexing the minutiae is that if two or more minutiae have very similar values of θ, then the order in which these two or more minutiae are indexed can vary between different minutiae maps. In order to account for this, the minutiae maps output by the unstable minutiae excluder 137 are input to a sequence resolver 141 which identifies sources of possible sequence ambiguity. In particular, minutiae whose values of θ are within a predetermined amount Δθ from each other are grouped together and a secondary indexing rule is applied. In this embodiment, the secondary indexing rule is that the minutiae in each group are indexed in the order of increasing r. A sequence resolution vector 143 is then stored as part of the ambiguity resolution vector 115, the sequence resolution vector 143 storing clusters of index numbers with each cluster identifying the index numbers for a group of minutiae which are to be re-indexed in order of increasing r. For example, if it is found that the values for θ for minutiae with index numbers 6, 7 and 8 are within as of each other, the sequence resolution vector stores a cluster identifying the index values 6, 7 and 8.

The sequence resolver 141 outputs N feature templates which each comprise a plurality of indexed features with each feature having an associated normalised distance r, angle θ and categorisation. In other words, each feature has three attributes (r, θ and category) which each have a corresponding attribute value. This feature template is input to the attribute value stabiliser 113. As shown in FIG. 17, the feature template is first input to a category attribute value adjuster 151 which forms part of the attribute value stabiliser 113. Although minutiae which have been classified in more than two categories have already been excluded, minutiae which have been classified in two different categories are still included. This category ambiguity is identified by the category attribute value adjuster 151. In particular, an order of precedence of the categories is preset and for each minutia whose category is ambiguous, it is determined whether the category which is higher or lower in the order of precedence is to be used. In this embodiment, this assignment is performed based on which category was assigned to the minutia in the majority of the N feature templates. A category resolution vector 153 for the minutia, which stores a value indicating whether or not the higher or lower category in the order of precedence is to be used in case of ambiguity, is then generated and stored as part of the ambiguity resolution vector 115.

The normalised distance r and the angle θ for each feature are then processed by a location attribute value quantiser 155 and a location attribute value adjuster 159 to stabilise the location attribute values.

Firstly, the normalised distance r for one of the features is statistically compared over the N feature templates by the location attribute value quantiser 155 to determine the average and the standard deviation of the measured values. A confidence interval a, corresponding to a predetermined confidence level, is then calculated using conventional statistical analysis of the standard deviation. In this embodiment, the confidence interval a is the range of normalised distance r within which, based on the determined standard deviation, 99% of measurements would fall. A quantisation unit Q, corresponding to the spacing between neighbouring quantisation levels, is then set equal to this confidence interval σ. In this way, if the mean value of the normalised distance r is midway between two neighbouring quantisation levels then there is a 99% probability that the value of the normalised distance r for a subsequent fingerprint image will fall within the neighbouring quantisation level. It will be appreciated that the quantisation levels are closer together for a relatively low standard deviation than for a relatively high standard deviation. The same procedure is then performed for the angle θ to determine a corresponding average value and quantisation unit. This procedure is then sequentially applied to the remaining features so that each feature will have corresponding average values of the normalised distance r and the angle θ, and will also have corresponding quantisation units for the normalised distance r and angle θ. In this embodiment, the quantisation units for each feature are independently set so that they can be larger for features which have a large standard deviation for their measurement.

The quantisation unit sizes for the normalised distance r and the angle θ for each feature are stored as a unit vector 157. The average normalised distance r and the average angle θ for each feature are then divided by the corresponding quantisation units to generate a quantised feature template.

The quantised feature template is input to a location attribute value adjuster 159 which determines offset values for the quantised values of the average distance r and the average angle θ which, when added to the quantised values, place the quantised values approximately midway between two neighbouring quantisation levels. For example, if the statistical analysis indicated that a quantisation level should occur every quarter of the normalisation distance (i.e. there are quantisation levels at 0.25, 0.5, 0.75 ... ), then if the mean value of the normalisation distance r is 0.272, a quantised value is calculated by dividing the normalised distance r by 0.25 to give 1.088. An offset value is then calculated by truncating the quantised value (to give a value of 1), adding 0.5 (to give a value of 1.5) and subtracting the quantised value to give an offset value of 0.412. Similarly, if the mean value of the normalisation distance r is 0.241, then an offset value is calculated by truncating the quantised value, i.e. truncating 0.964 to give 0, adding 0.5 and subtracting the quantised value to give an offset value of −0.464. The offset values for the normalised distance r and angle θ for each feature of the quantised feature template are then stored as an offset vector 161 which forms part of the ambiguity resolution vector 115.

The location attribute value adjuster 159 then adds the respective offset values to the normalised distance r and angle θ for each feature of the quantised feature template to generate an adjusted feature template.

The adjusted feature template output by the location attribute value adjuster 159 is then input to a location attribute value truncator 163 which truncates the values for the offset distance r and the offset angle θ to form the stabilised feature template.

The stabilised feature template is input to a number generator 117 in which it is first input to an error corrector 165 which generates an error correction vector 119 in the same manner as for the first embodiment, and then the corrected feature template is input to a value concatenator 167 which, for each feature used for data, concatenates the category value and the truncated values of the normalised distance r and the angle θ to form a feature value, and the feature values for each of the measurement minutia are then concatenated in order of index number to form the biometric value $K_{bio}$.

In this embodiment, the unit vector 157 and the offset vector 161 are generated so that the probability of the same value being regenerated correctly in a subsequent measurement is predetermined. This will be explained in more detail with reference to FIG. 18A to 18D.

FIG. 18A shows an ideal probability distribution function for the measured length of a feature whose actual length is d. As shown, the ideal probability distribution function is a delta function at the distance d. In real life, however, such an ideal probability distribution function is never achieved. Instead, systematic errors caused by the way that the measurement is taken, and random errors mean that the measured value is not necessarily equal to d. This invention has particular relevance to the handling of random errors inherent to a measurement. FIG. 18B shows the actual probability distribution for a measurement assuming that no systematic errors are present. As shown, the probability density function is a normal function centred at the distance d. Those skilled in the art will appreciate that a confidence interval σ, which corresponds to the range of distances in which a measurement will fall for a predefined level of confidence, can be calculated for the probability distribution function. This confidence interval σ is then used as the quantisation unit Q. FIG. 18C shows the probability density function on a scale generated using the quantisation value Q.

As shown in FIG. 18C, the distance d is just less than one of the quantisation levels (i.e. 6Q) and therefore there is a significant likelihood that in a subsequent measurement the measured value will be in excess of 6Q. Thus, the likelihood that the truncated value is 5 is only slightly greater than the likelihood that the truncated value is 6. An offset value is therefore calculated which places the centre of the probability distribution function midway between two neighbouring quantisation levels. As shown in FIG. 18D, after the offset value has been added the probability density function is centred at d', where d' equals 5.5Q. As the quantisation unit Q has been determined based on a confidence interval of the probability density function, the likelihood that the truncated value is 5 is equal to the confidence level of the confidence interval.

The operations performed in a subsequent re-generation of the biometric value $K_{bio}$ will now be described with reference to FIG. 19.

Firstly, the fingerprint sensor 103 captures, in step S131, an image of a fingerprint. The image data output by the fingerprint sensor 103 is then processed, in step S133, by the image converter 107 to identify the origin and the minutiae. The image converter 107 then aligns, in step S135, the minutiae using the alignment vector 109. In particular, the principal minutiae and the secondary minutiae are identified and a principal axis is formed by extending a straight line from the origin through the principal minutia. The distances from the origin to the remaining minutiae are then normalised with respect to the distance between the origin and the principal minutia. The (r,θ) coordinates for all but one of the secondary minutiae are then compared with the (r,θ) coordinates of the corresponding secondary minutiae stored in the reference alignment data and a transform is determined to compensate for image distortion. This transform is then applied to the coordinates of all the minutiae and the transformed (r,θ) coordinates of the remaining secondary minutiae are compared with the (r,θ) coordinates of the corresponding secondary minutia in the reference alignment data to check that the transform is adequate.

After the minutiae have been aligned using the alignment vector, the minutia map output by the image converter 107 is processed by the feature template generator 111. In particular, the minutiae indexer 135 indexes each minutia and then the unstable minutiae excluder 137 excludes, in step S137, any minutiae identified in the exclusion vector 139. The remaining minutiae are then input to the sequence resolver 141 which resolves, in step S139, any sequence ambiguity for minutiae identified in the sequence resolution vector 143. Further images of the fingerprint 101 are then scanned and processed until M (where M>1) feature templates have been generated.

The M feature templates output by the feature template generator 111 are then input to the attribute value stabiliser 113 which generates a stabilised feature template. In particular, the feature template is input to the category attribute value adjuster, which resolves, in step S141, categorisation anomalies over the M feature templates using the category resolution vector 153. The position values of the minutiae are then quantified, in step S143, by inputting each feature template into the location attribute value quantiser 155, which uses the unit value stored in the unit vector 157 to scale the measured position values, and each quantised feature template is input to the location attribute value adjuster 159 which adjusts the position values using the offset value stored in the offset vector 161, and finally each adjusted feature template is input to the location attribute value truncator 163 which truncates the attribute values and outputs the corresponding stabilised feature template.

The M stabilised feature templates are then input to the number generator 117 which generates, in step S145, the biometric value $K_{bio}$ using the error correction vector 119.

Third Embodiment

In the first and second embodiments, the iris and the fingerprint of an individual were respectively used to generate a biometric value $K_{bio}$ associated with that individual. Another possible source of biometric data is the retina as the vasculature pattern on the retina is representative of an individual. A third embodiment will now be described with reference to FIGS. 20, 21A and 21B, in which the biometric value $K_{bio}$ is determined from the image of a retina.

As shown in FIG. 20, the retina of an eye 201 is scanned using a retinal image scanner 203 to generate image data corresponding to the retina. FIG. 21A shows an image of a typical retina. As shown, the retina image includes a plurality of tree-shaped vasculature patterns which emanate from the optic nerve 231. In this embodiment, the portion of the image used to generate the biometric value $K_{bio}$ is an annulus centred on the centre of the optic nerve with the inner radius of the annulus generally corresponding to the radius of the optic nerve and the outer radius of the annulus being a predetermined multiple of the inner radius.

In this embodiment, the positions of branching points, where a branch of one of the tree-shaped vasculature patterns splits into two or more sub-branches, and cross points where a branch of one tree-shaped vasculature pattern crosses the branch of a different vasculature pattern, are measured to generate the biometric value $K_{bio}$. These branching points and cross points will hereafter be referred to as nodes. FIG. 21B shows the annular sample portion, with nodes indicated by circles, corresponding to the retina illustrated in FIG. 21A.

During the enrolment process, the image converter 207 extracts the annular sample portion and stores the remainder of the image data as the alignment vector 209. In particular the image converter 207 performs conventional image processing techniques to identify the optic nerve 231, calculates the centre and radius of the optic nerve, then calculates the outer radius of the annular sample portion by multiplying the radius of the optic nerve 231 by a predetermined amount. The image converter 207 also identifies a node outside of the annular sample portion to act as the principal node 233. A principal axis is then formed by a line connecting the centre of the annular sample portion and the principal node 233.

The image converter 207 also identifies all of the nodes within the annular sample portion using conventional image processing techniques. The (r,θ) coordinates of these nodes are then stored to form a retina map, which is input to a feature template generator 211. In the same manner as described in the second embodiment, the feature template generator 211 indexes the nodes, identifies nodes which are not reliably reproduced and stores their coordinates as an exclusion vector, and identifies sequence ambiguity and generates a sequence resolution vector. The feature template output by the feature template generator 211 is input to an attribute value stabiliser 213 which stabilises the location value of each node by generating respective unit values for the distance r and the angle θ using the generated unit value, calculating respective offset values for the quantised distance r and the quantised angle θ, and then adjusting the quantised distance r and the quantised angle θ using the offset values. The unit values and the offset values are respectively stored in a unit vector and an offset vector. The adjusted location coordinates are then truncated to form a stabilised feature template.

The stabilised feature template is input to a number generator 217 which, in the same manner as described in the second embodiment, generates the biometric value $K_{bio}$ using an error correction vector 219.

During regeneration of the biometric value $K_{bio}$, the retina of the eye 201 is scanned by the retinal image scanner 203 and the resulting image data is input to the image converter 207. The image data is aligned by the image converter 207 using the reference alignment data stored in the alignment vector 209 and a retina map is generated. This retina map is input to the feature template generator 211 which generates a feature template using the exclusion vector and sequence resolution vector stored in the ambiguity resolution vector 215. The feature template is then input to the attribute value stabiliser 213, which stabilises the location values of the features within the feature template using the unit vector and offset vector stored in the ambiguity resolution vector 215, and the stabilised feature template is input to the number generator 217 which generates the biometric value $K_{bio}$ using the error correction vector 219.

Fourth Embodiment

In the first, second and third embodiments, biometric data is generated by measuring a biological feature of an individual. However, the number generation technique of the present invention can also be applied in other circumstances. A fourth embodiment will now be described with reference to FIGS. 22 to 25 in which a number $K_{pho}$ is generated representative of a photograph. In particular, in the fourth embodiment an apparatus is described which prints an identification card including a photograph of an individual and authentication data authenticating the issuer of the identification card and also verifying that the photograph is the same as the photograph used to issue the identification card. An identification card reader is then able to read the information stored on the identification card and by scanning the photograph and regenerating the photograph number $K_{pho}$, to verify that the identification card is valid and that the photograph has not been tampered with.

FIG. 22 shows the apparatus for generating the identification card and FIG. 23 shows a typical identification card 351. As shown in FIG. 23, the identification card 351 has an image 353 of an individual presented within a rectangular frame 355. Written on the identification card 351 are personal details (in particular the name, address, date of birth and nationality) for the individual shown in the image 353. A bar code 359 is also printed on the identification card 351. As will be described in more detail hereafter, the bar code stores an ambiguity resolution vector and an error correction vector which are both related to the image 353, a digital signature for authenticating the identification card 351 and the personal data of the individual shown in the image 353. In this embodiment, the bar code 359 is a PDF417 two-dimensional bar code.

Returning to FIG. 22, the photograph 301 of the individual is scanned using an image scanner 303. The image data corresponding to the photograph 301 which is generated by the image scanner 303 is input to an image converter 305 which adds image data corresponding to the rectangular frame and transforms the image data into a coordinate system having an origin located at the bottom left hand corner of the frame 355 (as shown in FIG. 23) and X and Y axes being formed in horizontal and vertical directions respectively (as shown in FIG. 23).

The transformed image data is input to a feature template generator 307 which converts the colour image data into grey scale image data and applies a grid of 40 rows by 20 columns to the image data corresponding to the photograph 301. In this embodiment, the amount of data within the ambiguity resolution vector must be kept low as only a limited amount of data is able to be stored within a PDF417 bar code. In order to do this, the feature template generator 307 excludes parts of the image which do not contain much information, e.g. a plain background. In particular, the feature template generator 307 groups the grid cells into macro-cells, with each macro-cell having a 4 by 4 array of grid cells. Thus, the image data corresponding to the photograph 301 is separated into a grid of 50 macro-cells. The feature template generator 307 then selects the 20 macro-cells which have the most significant information content. Typically, these macro-cells correspond to the portion of the photograph 301 having the face of the individual and the clothes of the individual. An exclusion vector is then generated which excludes the remaining 60% of the macro-cells. This exclusion vector therefore requires 50 bits, (one for each macro-cell) or about 7 bytes, of information.

For the non-excluded macro-cells, the feature template generator calculates a normalised average grey level value for each grid cell as described in the first embodiment, and then generates a feature template which is output to an attribute value stabiliser 309.

The attribute value stabiliser 309 generates a unit value which is used to scale all the normalised grey levels as described in the first embodiment. Then, the attribute value stabiliser 309 calculates an offset value for each feature of the feature template and stores the offset values as an offset vector. In order to reduce the amount of information stored in the offset vector, this offset value is set to either 0 or 0.5 scaled units. In this way, the offset value can be represented by a single bit. However, this effectively means that the value is not positioned midway between neighbouring quantisation boundaries, but is instead positioned somewhere within the second and third quartiles between neighbouring quantisation boundaries. This has a consequent impact on the stability of the truncated values.

The exclusion vector, unit vector and offset vector are input to an ambiguity resolution vector generator 311 which generates a corresponding ambiguity resolution vector. This ambiguity resolution vector is input to a bar code generator 325 for inclusion within the bar code.

The stabilised feature template output by the attribute value stabiliser 309 is input to an image number generator 313 which generates the photograph number $K_{pho}$. In this embodiment, a factor 3 redundancy is used, i.e. 2 error correction bits are provided for each bit of data. Error correction values are generated in the same manner as the first embodiment. The error correction values generated by the image number generator 313 are input to an error correction vector generator 315 which generates a corresponding error correction vector which is input to the bar code generator 325 for inclusion within the bar code. This error correction vector contains approximately 27 bytes of information.

Personal details relating to the individual shown in the photograph 301 are input, via a user interface 317, to a personal data generator 319. The personal data generated by the personal data generator 319 is input to the bar code generator 325 for inclusion within the bar code, and is also input to an identification data generator 321. The photograph number $K_{pho}$ is also input to the identification data generator 321 where it is combined with the personal data to form identification data. This identification data is input to a digital signature generator 323 which performs a secure hashing algorithm on the identification data to generate a one-way hash. This one-way hash is then encrypted using a private encryption key $K_{pri}$ generated using the RSA algorithm for the card issuer. The digital signature generated by the digital signature generator 323 is then input to the bar code generator 325 for inclusion within the bar code.

The framed image produced by the image converter 305, the bar code produced by the bar code generator 325, and the personal data produced by the personal data generator 319 are all input to an image processor 327 which collates the information to generate the image data for the identification card. The generated image data is then printed by the printer 329 to form the identification card 351.

FIG. 24 shows the main components of an identification card reader which is used to check the details on an identification card 351. The reader includes an image scanner 401 which scans the image of the identification card 351 and outputs the image data to a bar code reader 403 and a photo converter 405. The bar code reader 403 identifies the portion of the image data relating to the bar code 359 using conventional image processing techniques and inputs the bar code image data to a bar code data analyser 407 which extracts the ambiguity resolution vector, the error correction vector, the digital signature and the personal data stored within the bar code 359.

The photo converter 405 identifies and aligns the portion of the image corresponding to the photograph by applying a conventional image processing operation to identify the frame 355. The image data corresponding to the photograph is then input to a feature template generator 409 which converts the colour image data to grey scale and applies a 40 by 20 grid. The feature template generator 409 then excludes the grid cells indicated by the exclusion vector within the ambiguity resolution vector, and for the non-excluded grid cells calculates a normalised average grey level value in order to generate a feature template. This feature template is then input to an attribute value stabiliser 411 which stabilises the normalised average grey level values using the unit vector and the offset vectors forming part of the ambiguity resolution vector. The stabilised feature template output by the attribute value stabiliser 411 is then input to an image number generator 413 which generates the photograph number $K_{pho}$ using the error correction vector.

The photograph number $K_{pho}$ is then input, together with the personal data recovered from the bar code 359, into an identification number generator 415 which generates the identification data for the identification card 351. This identification data is then input to an identification card verifier 417 which verifies whether or not the identification card 351 was issued by the certifying authority and also whether or not the photograph shown in the identification card is the original photograph used when the identification card was issued.

FIG. 25 shows in more detail the main components of the identification card verifier 417. As shown, the identification data from the identification data generator 415 is input to a secure hashing algorithm unit which applies the same secure hashing algorithm as applied in the identification card generator. The one-way hash output by the secure hashing algorithm unit 431 is input to a comparator 433. The digital signature recovered from the bar code 359 is input to a decryption unit 435 which decrypts the digital signature using the public key $K_{pub}$ 437 for the card issuer. The decrypted digital signature is input to the comparator 433 where it is compared with the hashed number. If the identification card was produced by the card issuer and the photograph in the identification card is the same as the photograph used by the card issuer, then the one-way hash output by the secure hashing algorithm unit 431 is identical to the decrypted number output by the decryption unit 435 and this is detected by the comparator 433.

Returning to FIG. 24, the output of the identification card verifier 417 is input to a display data generator 419 together with the personal data retrieved from the bar code 359 by the bar code data analyser 407. The display data generator 419 then generates drive signals which are sent to a display 421 in order to display to the user of the reader the personal details stored in the bar code and an indicator whether or not the identification card is valid.

Modifications and Further Embodiments

In the first to third embodiments, the repeatability of a biometric value $K_{bio}$, generated by processing biometric data corresponding to a biological feature of an individual, is improved by systematically adapting the manner in which properties of the biometric data are measured in accordance with process data generated by a training process. In the fourth embodiment, an analogous systematic measurement technique is performed to generate a number from image data corresponding to a photograph. The way in which the processing of the measurement values is performed in the first to fourth embodiments to arrive at a number (e.g. the biometric value $K_{bio}$) is fundamentally different from conventional measurement systems.

Conventionally, the manner in which a measurement is performed is constrained by the need for the resulting number to conform to a measurement standard. For example, a distance is conventionally measured to conform with the international system of units of measurement (the SI system) so that the distance value can be compared with other distance values. The focus of the measurement system is to maximise the accuracy of the measurement within the constraints of the measurement standard.

For the present invention, it has been recognised that when generating a number representative of analogue data, the accuracy of the measurement value is not important but instead the repeatability of the measurement value is important. Therefore, in the first to fourth embodiments the conventional constraints associated with obtaining accurate measurement values have been discarded and techniques have been developed to improve the repeatability of the measurement value instead. As an example, in the second embodiment a number corresponding to the categorisation of a fingerprint minutia is calculated, and a category resolution vector imposes an arbitrary ruling for determining the category in cases of ambiguity. Whether this arbitrary ruling improves or reduces the likelihood of the minutia being correctly categorised is immaterial; what matters is that the repeatability of the identified category is improved.

In the first to fourth embodiments features are identified within continuously varying data, hereafter called analogue data. The analogue data can originate from many different sources in addition to those described in the first to fourth embodiments. For example, in an embodiment biometric data is obtained by recording an individual uttering a phrase. In other embodiments, the analogue data is generated by imaging an engraving or a jewel with an image sensor. Alternatively, a purpose-defined object having sharply defined, but random, geometric properties is probed using ultrasound to generate analogue data.

In the first to fourth embodiments, the analogue data is processed to identify features of the analogue data. These features have attributes which have associated values that are measured and combined to generate a number. However, the features which are identified, and the attributes of the features which are measured, need not be the same as described in the first to fourth embodiments.

The repeatability of the number generated from the analogue data is improved by ensuring stable identification of features and by stabilising the measured attribute values. As described in the first and fourth embodiments, a stable set of features can be obtained by applying an arbitrary (in the sense that it is not related to the analogue data) division of the analogue data into separate parts. In the first and fourth embodiments, a grid is applied to a two-dimensional array of image data. Alternatively, for a one-dimensional array of analogue data, e.g. a sound recording, the analogue data could be separated into segments.

Instead of applying an arbitrary segregation of the analogue data, the data could be segregated in accordance with the information content of the data to generate features. For example, the grid cell sizes could be varied across a two-dimensional data array in dependence upon the way the data varies across the two-dimensional array. Alternatively, the features could inherently form part of the information content of the analogue data (for example, the minutiae within a fingerprint as described in the second embodiment).

Whenever a measure of the information content of the analogue data is used to identify features there is a possibility of ambiguity occurring because there is a possibility that the measure of the information content will fall close to a boundary between there being a feature or there being no feature. Further, there may be an ambiguity in the order in which the features are indexed for different batches of analogue data obtained using the same data source. In order to reduce this feature ambiguity a training process is performed during which process information indicating how the analogue data is to be processed is generated and stored for use in subsequent number regeneration.

For example, if during the training process it is discovered that a measure of information content identifying a feature falls close to a boundary between the feature being present and the feature being absent, a process instruction is stored indicating that the measure does not correspond to a feature. The exclusion vector of the second embodiment is an example of such a process instruction. If during the training process it is discovered that the order in which a group of features is ordered varies, then a process instruction is stored which indicates the order in which the features is to be indexed. The sequence resolution vector of the second embodiment is an example of such a process instruction.

The attributes whose values are used to generate a number can relate either to a measurement of a property of the feature, for example the location of a fingerprint minutia, or to a structure of the feature determined by measuring one or more properties of the feature, for example the category of a fingerprint minutia. If the attribute relates to the structure of the feature, then typically the structure will be classified in one of a plurality of categories, each category having an associated number. This categorisation involves defining for each category one or more conditions which have to be satisfied by predefined measurements performed on the analogue data. There is, therefore, a possibility of an error in the categorisation due to ambiguity caused by a predefined measurement being close to a boundary of a condition. In order to reduce the ambiguity, process instructions are stored indicating how a feature is to be classified. For example, in an embodiment if during the training process it is discovered that the category in which a feature is classified varies, then a process instruction is stored which indicates in which category the feature is to be classified. The category resolution vector of the second embodiment is an example of such a process instruction. In another embodiment, if during the training process it is discovered that the category in which a feature is classified varies, then a process instruction is stored which alters the one or more conditions to be satisfied for a category to conditions for which the ambiguity is less likely to occur.

If the attribute value relates to a measurement of a property of the analogue data, then the attribute value is determined to a lower resolution than the corresponding measurement value. In other words, each attribute value corresponds to a range of measurement values. If during the training process it is discovered that the attribute value varies because the corresponding measurement value is close to the boundary between the ranges for two attribute values, then a process instruction is stored which alters the measurement value so that it is approximately at the centre of the range for an attribute value, and ambiguity is less likely to occur. The offset vector of the first to fourth embodiments is an example of such a process instruction.

In the first to fourth embodiments, the attribute value is determined by performing a truncation of a measurement value to an integer value. This means that the ambiguity in the attribute value will be greatest when the measurement value is close to an integer value, as the chance of the measurement value being less than the integer value in a subsequent measurement is approximately equal to the chance of the measurement value being more than the measurement value. Therefore, in the described embodiments the measurement value is offset to be approximately midway between two integer levels. In an alternative embodiment, the attribute value is determined by rounding a measurement value to the nearest integer value. In this case, the greatest ambiguity occurs for measurement values approximately midway between neighbouring integer values, and therefore an offset vector is generated to shift the measurement value towards an integer value. In general, the range of measurement values corresponding to an attribute value can be arbitrarily set.

In the fourth embodiment, in order to reduce the amount of data stored in the ambiguity resolution vector, a sparse offset vector is used which stores a single binary digit, with a stored "0" representing a zero offset and a stored "1" representing an offset of 0.5. It will be appreciated that the two states of the binary digit could represent any two numbers separated by 0.5, for example −0.25 and +0.25. The binary digit enables the measurement value to be offset to be within a range of 0.5 units. It will also be appreciated that a three value number could be used to shift the measurement value to be within a range of 0.33 units, and a four value number could be used to shift the measurement value to be within a range of 0.25 units etc.

In an alternative embodiment, rather than using an offset vector to shift the measurement value, the measurement scale is varied so that the measurement value is moved to a region of low ambiguity. For example, if the attribute value is found by truncating the measurement value and the measurement value is 7.03, a new measurement scale with a unit size of 2 could be used so that, after transforming the measurement to the new measurement scale, the measurement value is 3.515 (i.e. approximately in the middle of the range between two neighbouring integer values and therefore in a region of low ambiguity). In this case, the desired unit size for the measurement is stored in the unit vector.

The use of the offset vector to shift the measurement value to a position of low ambiguity is preferred over the use of the unit vector because the unit vector is preferably used to control the level of repeatability of the number generated from the analogue data. In particular, as described in the second embodiment, preferably the unit value for a measurement is set equal to a confidence interval, corresponding to a desired confidence level, for the measurement determined during the training process. This confidence interval is determined by statistically analysing the measurement values, as described in the second embodiment. Alternatively, the unit value can be set by a user and the associated confidence level determined during the training process by statistically analysing a number of stabilised feature templates.

Even if the stabilisation of the identified features and the attribute values improves the repeatability of a measurement value to 99.9%, then if it is desired to generate a very large number there is still a significant chance that the number is not successfully regenerated. However, there is generally a large amount of data available which is not required for number generation. This redundant data can therefore be used for error correction as described in the first embodiment.

In the first embodiment, each attribute value used for determining the number (each data value) is associated with four error correction values. However, the more significant bits of the data value are more stable than the less significant bits and therefore the error correction data is not being efficiently used. In an alternative embodiment, separate error correction data is used for each bit of a data value, with the amount of error correction bits per data bit increasing from the most significant data bit to the least significant data bit.

An alternative to using the described error correction vector is to generate multiple batches of analogue data to generate multiple stabilised feature templates, and then to employ a voting regime to identify the most frequently occurring attribute values across the multiple stabilised feature templates.

Although the ambiguity resolution vector is initially determined by an enrolment process, in an embodiment during number regeneration the ambiguity resolution vector is adaptively varied. For example, if an offset value is being applied to a measurement value to position the measurement value approximately in the centre of a range corresponding to an attribute value, then the offset measurement value can be monitored and adapted so that the offset measurement values are more precisely located at the centre of the range. Further, statistical variation of the measurement values can be monitored during repeated number regeneration and the unit values stored in the unit vector varied in dependence upon the observed standard deviation. In other words, the training process can extend beyond the enrolment process to utilise data generated in subsequent number regeneration.

As there is no requirement for the attributes measured for different features to be the same, the process instructions could include for each feature an encoding strategy which identifies which attributes are to be measured. This encoding strategy could also specify sub-features which are to be identified for the feature. Each of the sub-features would then have its own encoding strategy stored in the process vector.

In the first embodiment, the colour image data is converted to grey scale image data prior to alignment being performed. Alternatively, the alignment could be performed first, and indeed could use specific colour patterns to perform the alignment.

A number of other ways are possible for isolating a sample portion corresponding to the iris. For example, in an embodiment the image aligner of the first embodiment is replaced by an image aligner which detects and stores the edge-detected outlines of the pupil and iris. These outlines are generally not perfectly circular and can therefore be used to perform alignment. In another embodiment, features within the iris image are used for alignment in the same manner as fingerprint minutiae are used for alignment in the second embodiment. In particular, a plurality of alignment image features are identified and a transform performed to reduce any image distortion in comparison to the iris images used during enrollment.

An alternative way of isolating a sample portion of the iris is described in U.S. Pat. No. 5,291,560, the contents of which are incorporated herein by reference.

As discussed already, there are many different features within image data for an iris which can be identified and analysed to generate a number representative of the iris. For example, the positions of edge detected features could be used in addition to, or instead of, the grid features. In another alternative embodiment, the image data is transformed, using for example a fast Fourier transform (FFT) algorithm, in which case the transform coefficients either form attribute values themselves or are used to calculate the attribute values. Instead of using a FFT algorithm, a wavelet transform algorithm or a Gabor transform algorithm could be used.

As discussed previously, in an embodiment the size of the grid cells of the grid applied to the iris image data in the first embodiment could be adaptively varied across the image data in accordance with local information content (i.e. the level of irregular variations) of the image data. In this way, smaller grid cells can be used in regions of high information content than are used in regions of low information content.

In the second embodiment, the origin of a fingerprint pattern is found by identifying the point of maximum ridge curvature. In an alternative embodiment, an origin is identified in the data representative of the fingerprint, and the ridge pattern corresponding to the origin is stored in the ambiguity resolution vector. The origin can then be located in subsequent images of the fingerprint by a pattern recognition process using the stored pattern data.

In a modification of the second embodiment, each minutiae map is generated from plural fingerprint images by stitching together portions of the plural images to generate a composite image. This improves the quality of the minutiae map.

In the third embodiment, a number representative of an individual is generated from the locations of nodes, corresponding to branching points and crossing points, of vasculature tree structures of the retina of the individual. However, the tree structure could be more rigorously investigated to extract a larger volume of information.

Each tree-structure generally has a root branch emanating from the optic nerve with a number of left sub-branches and a number of right sub-branches extending from the root branch. The root branch may end at a fork into two or more sub-branches or may simply extend to the edge of the sample image portion. Each sub-branch will similarly have a number of sub-branches branching to the left and a number of sub-branches branching to the right. The tree structure is therefore a recursive structure.

To represent such a recursive tree structure, the feature template can be formed in a hierarchical manner. In particular, the root branch can be defined as a feature having its own attributes and a number of sub-features corresponding to each sub-branch. Similarly, each of the sub-features could have its own attributes and a number of sub-features until a full representation of the tree structure is achieved. However, when determining the tree structure, possible ambiguities caused by variation of measured values needs to be resolved. For example, a simple splitting of a branch into two branches could have three possible interpretations: a sub-branch extending from the left of a parent branch; a sub-branch extending from the right of a parent branch; and the forking of the parent branch into a left sub-branch and a right sub-branch. General rules can be established setting measurement conditions to be satisfied for each of these interpretations. These measurement conditions could relate to, for example, the relative thicknesses of the branches and the angles subtended between the branches. However, there will always be ambiguity caused by measurement values close to the boundaries of these conditions. In an embodiment, if during the training process such an ambiguity is identified, then process instructions are stored which increase the likelihood of one of the interpretations to be satisfied. This could involve either varying the measurement value, for example using an offset vector, or for that particular node varying the required conditions for each interpretation.

In an embodiment, the nodal points of each vasculature tree structure are connected by straight lines (as shown in FIG. 21B). Measurement values can then be determined based on how the actual vasculature structure varies from the straight line. For example, the maximum normal distance between the straight line and the actual vasculature structure can be used as a measurement value. Further, the position of a node at which a sub-branch originates from a parent branch can be determined relative to the originating node of the parent branch. The angles between the straight lines corresponding to a sub-branch and a parent branch can also be used as measurement values.

In another embodiment, the number representative of the individual is determined purely from the tree structure of the feature template, and does not as such involve any attribute values. Such an embodiment significantly relaxes the requirements for alignment. However, this still requires the process instructions stored in the ambiguity resolution vector to stabilise the tree structure of the generated feature template. The tree structure of the total feature template can be represented by a tree structure number of the form:

<number of left branches> (tree number for each left branch), <number of right branches> (tree number of each right branch)

Such a tree structure number is distinctive and can therefore be used to generate the number representative of the individual.

The fourth embodiment describes an identification card system. Such an identification card system could be used in the manufacture of a passport.

As described above the present invention relates to generating a number representative of analogue data. This number has many uses. For example, the analogue number can be used as a personal identification number. For example, a computer terminal could be connected to a fingerprint sensor and in order to log onto the computer terminal, an individual enters identity data which identifies a process vector (including the ambiguity vector) associated with the individual which is either stored in the computer terminal or remotely accessed via a computer network. The individual then places a finger on the fingerprint scanner which generates image data which is processed by the computer terminal, using the process vector, to generate a number representative of the individual. This is then compared with a previously stored number to determine whether or not the individual is allowed to operate the computer terminal.

Alternatively, in another embodiment, the number is used as an encryption key, or is used to generate an encryption key, associated with the individual. An example of such an encryption system will now be described with reference to FIGS. 26 and 27.

FIG. 26 shows a computer 501 having a display 503, a keyboard 505 and a computer tower 507 which includes a slot 509 for receiving a floppy disk 511. The computer tower 507 includes a modem (not shown) which is connected, via a cable 513, to a telephone socket 515 to allow access to the Internet. A fingerprint sensor 517, which in this embodiment includes an ATMEL thermal sensing chip, is connected to a cryptographic unit 519 which is in turn connected to the computer tower 507.

FIG. 27 schematically shows how the cryptography unit 519 is configured to generate a biometric value $K_{bio}$ from the image data representative of the fingerprint of the user 21 and to use the generated biometric value $K_{bio}$ to generate either a mapping key $K_{map}$ or a cryptographic key $K_{pri}$. As shown, data from the fingerprint sensor 517 is input to an image processor 1001 which processes the data to form a feature template representative of features within the fingerprint. The feature template is then input to a fingerprint number generator 1003.

When enrolling a new user, the fingerprint number generator 1003 processes one or more feature templates representative of the fingerprint of the new user and determines processing instructions and process variables which improve the repeatability of a generated biometric value $K_{bio}$. These processing instructions and process variables are stored as a process vector 1005. A switch 1007 then directs the biometric value $K_{bio}$ to a mapping key generator. 1009, and a cryptographic key generator 1011 generates a private key $K_{pri}$ and public key $K_{pub}$ pair, of which the public key $K_{pub}$ is sent to a certifying authority and the private $K_{pri}$ is input to the mapping key generator 1009. The biometric value $K_{bio}$ and the private key $K_{pri}$ are used by the mapping key generator 1009 to generate a mapping key $K_{map}$, using a monotonic mapping function, and the mapping key $K_{map}$ is stored in a mapping key store 1013.

After enrolment, when a user wishes to generate the private key $K_{pri}$, the fingerprint sensor 517 scans the fingerprint of the user and sends image data to the image processor 1001, which generates one or more feature templates. The fingerprint number generator 1003 processes the one or more generated feature templates, using the processing instructions stored in the process vector store 1005, to generate the biometric value $K_{bio}$ and the switch 1007 directs the biometric value $K_{bio}$ to a private key generator 1015. The biometric value $K_{bio}$ and the mapping key $K_{map}$ are combined by the private key generator 1015, using the monotonic mapping function, to generate the private key $K_{pri}$.

The cryptographic unit 519 is then able, for example, to create a digital signature using the private key $K_{pri}$ or to decrypt a message received from the computer 1 using private key $K_{pri}$.

Preferably, the random seed number used by the cryptographic key generator 1011 is derived from the measurement values obtained by performing measurement operations on the analogue data. For example, the manner in which the measurement values vary between different batches of analogue data has a high level of randomness, and therefore forms a good source for generating a random seed number.

Although in the first to third embodiments, the same apparatus is used both to carry out the enrolment process and the subsequent number regeneration, alternatively the enrolment process and the number regeneration process could be performed by separate devices. However, if the number regeneration is performed by a separate device to the enrolment, then the process vector must be transferred from the enrolment apparatus to the number regeneration apparatus. This could be performed, for example, by transferring the process vector to a storage device (e.g. a floppy disc or a CD-ROM) which is moved to the number regeneration apparatus where the process vector is downloaded into the regeneration apparatus, or alternatively the enrolment apparatus and the number regeneration apparatus could be connected via a computer network, in which the process vector is transmitted across the computer network as an electrical signal.

The processing of the analogue data can either be performed by a hardware device, software running on a computer, or the processing could be split between a hardware device and software running on a computer. As many of the processing operations are suited to different sources of analogue data, the invention is well suited to being implemented in software using an object oriented programming language such as Java or C++.

As described, as well as computer apparatus and processes performed in the computer apparatus, the invention also extends to computer programs, particularly computer programs on or in a carrier, adapted for putting the invention into practice. The computer program may be in the form of source code, object code, a code intermediate source and object code such as in partially compiled form, or in any other form suitable for use in the implementation of the processes according to the invention.

The carrier may be any entity or device capable of carrying the program. For example, the carrier may comprise a storage medium such as a ROM, for example a CD ROM or a semiconductor ROM, or a magnetic recording medium, for example a floppy disk or hard disk. Further, the carrier may be a transmissible carrier such as an electrical or optical signal which may be conveyed via electrical or optical cable or by radio or other means.

When the program is embodied in a signal which may be conveyed directly by a cable or other device or means, the carrier may be constituted by such cable or other device or means. Alternatively, the carrier may be an integrated circuit in which the program is embedded, the integrated circuit being adapted for performing, or for use in the performance of, the relevant processes.

The invention claimed is:

1. A method of generating process information for a number generation process operable to generate a number representative of an analogue source from an analogue data set corresponding to the analogue source, the method comprising the steps of:

receiving for an analogue source at least one training analogue data set representative of said analogue source;

performing a set of measurements on each of the at least one training analogue data sets to obtain for each training analogue data set a corresponding set of measurement values suitable for processing by said number generation process;

for at least one measurement of the set of measurements:
analysing the stability of the number generated by the number generation process in response to change in the corresponding measurement value; and
determining at least one process instruction operable to modify the processing of the corresponding measurement value during the number generation process to improve the repeatability of numbers generated by the number generation process in case of change in said corresponding measurement value; and generating processing information indicative of the at least one determined process instruction, whereby the repeatability of the number generated by the number generation process is improved for subsequent performances of the number generation process on analogue data sets corresponding to the analogue source by using said processing information.

2. The method according to claim 1, wherein the number generation process defines a sequence of numerical ranges, each numerical range having an upper numerical boundary and a lower numerical boundary, and generates the number representative of the analogue source in dependence upon the numerical range corresponding to a measurement value.

3. The method according to claim 2, wherein said analysing step comprises determining for at least one measurement of the set of measurements the position of the corresponding measurement value within said corresponding range, and determining a process instruction operable to vary the relative position between the corresponding measurement value and at least one of the upper and lower numerical boundaries to increase the distance between the corresponding measurement value and the closest range numerical boundary.

4. The method according to claim 3, wherein said analysing step comprises determining a process instruction comprising an offset value to be added to the measurement value.

5. The method according to claim 4, wherein the offset value is operable to position the corresponding measurement value in the middle of a numerical range.

6. The method according claim 2, wherein said receiving step comprises receiving a plurality of training analogue data sets,
wherein for at least one measurement of the set of measurements, the analysing step comprises statistically analysing the respective measurement values for the plurality of training analogue data sets, and determining a process instruction defining the sequence of numerical ranges associated with the respective measurement values in dependence upon said statistical analysis.

7. The method according to claim 6, wherein the analysing step is performed for plural measurements of the set of measurements, and a process instruction defining a respective different sequence of numerical ranges is determined for each of said analysed plurality of measurements.

8. The method according to claim 6, wherein said statistical analysis comprises calculating a value indicative of the standard deviation of the respective measurement values for the analysed measurement, wherein the determined process instruction sets the upper and lower numerical boundaries in dependence upon said value indicative of the standard deviation.

9. The method according to claim 1, wherein the number generation process comprises identifying a plurality of features within each training analogue data set, the plurality of features being identified by one or more of the set of measurements satisfying respective conditions.

10. The method according to claim 9, wherein said analysing step comprises analysing the stability of the identification of a feature to variation in the corresponding measurement values for the respective one or more of the set of measurements, and determining at least one process instruction operable to modify the identification of the feature to reduce the sensitivity of feature identifications to variation in said corresponding measurement values.

11. The method according to claim 10, wherein said receiving step comprises receiving a plurality of training analogue data sets, and wherein the analysing step is performed for a plurality of the set of measurements, and if a feature is not stably identified in all the plurality of the set of features, a process instruction excluding the feature.

12. The method according to claim 10, further comprising the step of indexing the identified features in dependence on respective measurement values associated with the features, wherein said analysing step comprises analysing the stability of the indexing to variation in the respective measurement values associated with the features, and determining at least one process instruction operable to modify the indexing of the features to improve repeatability of the indexing in case of variation in the respective measurement values.

13. The method according to claim 12, wherein the process instruction defines an indexing rule for a plurality of features.

14. The method according to claim 9, wherein said set of measurements comprises a first set of measurements for identifying features within the training analogue data sets, and a second set of measurements for measuring attributes of the identified features to obtain at least some of the measurement values.

15. The method according to claim 14, wherein the number generation process comprises classifying features in a plurality of categories in dependence upon one or more of the second set of measurements satisfying a condition.

16. The method according to claim 15, wherein said receiving step comprises receiving a plurality of training analogue data sets, and wherein the analysing step is performed for a plurality of the set of measurements, and if a feature is classified in different categories in different analogue data sets, a process instruction excluding the feature is determined.

17. The method according to claim 15, wherein said receiving step comprises receiving a plurality of training analogue data sets, and wherein the analysing step is performed for a plurality of the set of measurements, and if a feature is classified in three or more different categories in different analogue data sets, a process instruction excluding the feature is determined.

18. The method according to claim 17, wherein if a feature is classified in two different categories in different analogue data sets, a process instruction modifying the classification is determined.

19. The method according to claim 18, wherein the processing instruction comprises a classification rule for a feature.

20. The method according to claim 1, wherein at least one of the set of measurements comprises applying a transform function and the corresponding measurement value is given by the respective transform co-efficient.

21. The method according to claim 20, wherein the applied transform is a fast Fourier transform.

22. The method according to claim 20, wherein the applied transform is a wavelet transform.

23. The method according to claim 20, wherein the applied transform is a Gabor transform.

24. The method according to claim 1, wherein at least one of the set of measurements comprises a pattern recognition operation.

25. The method according to claim 1, wherein at least one of the set of measurements is performed by segregating the training analogue data set into plural parts, and individually measuring properties of the plural parts.

26. The method according to claim 25, wherein the average analogue data value is measured for each of the plural parts.

27. The method according to claim 1, further comprising applying the number generation process to generate the number representative of the analogue source.

28. The method according to claim 27, wherein the number generation process comprises the steps of: deriving a plurality of data values and a plurality of error correction values using the set of measurement values;
combining the data values to generate the number representative of the analogue source; and calculating error correction information using the error correction values and the data values.

29. The method according to claim 28, wherein the calculating error correction information step comprises processing each error correction value using an associated data value.

30. The method according to claim 29, wherein a bitwise exclusive-OR function is applied to each error correction value and the corresponding data value to generate the error correction information.

31. A method according to claim 27, wherein said number generation process comprises a process for generating a cryptographic key.

32. A method according to claim 27, wherein said number generation process comprises a process for generating a personal identification number.

33. The method according to claim 28, further comprising combining the error correction information and the processing information.

34. The method according to claim 1, further comprising performing a pre-processing step prior to performing said set of measurements, the pre-processing step comprising generating alignment data from the at least one received training analogue data set.

35. The method according to claim 34, wherein the receiving step comprises receiving a plurality of training analogue data sets, and wherein the pre-processing step comprises using the stored alignment data to align the information content of the plurality of training analogue data sets.

36. The method according to claim 34, wherein in the pre-processing step alignment data is generated by identifying a plurality of distinctive patterns within an analogue data set and storing the locations of the distinctive patterns.

37. The method according to claim 36, further comprising the storing the distinctive pattern in association with the corresponding location.

38. The method according to claim 34, further comprises normalising the training analogue data sets.

39. The method according to claim 1, wherein the analogue data source is a biological feature of an animal.

40. The method according to claim 39, wherein the analogue data source is the iris of an eye.

41. The method according to claim 39, wherein the analogue data source is a retina of an eye.

42. The method according to claim 39, wherein the analogue data source is a fingerprint.

43. The method according to claim 1, wherein the analogue data source is a photograph.

44. The method of generating a number representative of an analogue source, the method comprising the steps of: generating process information in accordance with a method according to claim 1; receiving an analogue data set representative of the analogue source; performing the set of measurements on the analogue data set to obtain a set of measurement values; and applying the number generation process using the set of measurement values corresponding to the analogue data set, in accordance with the processing instructions stored in said process information, to generate said number representative of the analogue source.

45. The method according to claim 1, wherein the at least one determined process instruction comprises an ambiguity resolution vector.

46. A method according to claim 1, wherein said number generation process comprises a process for generating a cryptographic key.

47. A method according to claim 1, wherein said number generation process comprises a process for generating a personal identification number.

48. A method according to claim 1, wherein said process instruction is operable, during the number generation process, to generate a modified measurement value from the measurement value.

49. A method of generating a number representative of an analogue source, the method comprising the steps of:
receiving an analogue data set representative of the analogue source;
performing a set of measurements on the analogue data set to obtain a set of measurement values;
retrieving process information from a data store; and
applying a number generation process using the set of measurement values, in accordance with the processing instructions stored in said process information, to generate said number representative of the analogue source;
wherein the process information is indicative of at least one determined process instruction for modifying the processing of said set of measurements to stabilize the number generated by the number generation process, thereby improving the repeatability of the number generated by the number generation process for the analogue source.

50. A method according to claim 49, wherein the number generation process defines a sequence of numerical ranges, each numerical range having an upper numerical boundary and a lower numerical boundary, and generates the number representative of the analogue source in dependence upon the numerical range corresponding to a measurement value.

51. A method according to claim 50, wherein said process information defines a process instruction operable to vary the relative position between a measurement value and at least one of the upper and lower numerical boundaries of the corresponding numerical range to increase the distance between the corresponding measurement value and the closest range numerical boundary.

52. A method according to claim 51, wherein said process instruction comprising an offset value which is added to the measurement value during the number generation process.

53. A method according to claim 52, wherein the offset value is operable to position the corresponding measurement value in the middle of a numerical range.

54. A method according to claim 50, wherein said process information comprises a process instruction defining the upper and lower boundaries for the sequence of numerical ranges associated with the respective measurement values.

55. A method according to claim 54, wherein the process information defines process instructions defining respective different sequence of numerical ranges at least two measurement values.

56. A method according to claim 54, wherein the determined process instruction sets the upper and lower numerical boundaries of the numerical ranges for a corresponding measurement value in dependence upon a predetermined standard deviation for the corresponding measurement value.

57. A method according to claim 49, wherein the number generation process comprises identifying a plurality of features within the analogue data set, the plurality of features being identified by one or more of the set of measurements satisfying respective conditions.

58. A method according to claim 57, wherein said process information comprises at least one process instruction operable to modify the identification of a feature.

59. A method according to claim 58, wherein said process information comprises a process instruction excluding a feature associated with one or more measurement values.

60. A method according to claim 57, wherein said set of measurements comprises a first set of measurements to obtain a first set of measurement values for identifying features within the analogue data sets, and a second set of measurements for measuring attributes of the identified features to obtain a second set of the measurement values.

61. A method according to claim 60, wherein the number generation process comprises classifying features in a plurality of categories in dependence upon one or more of the second set of measurements satisfying respective conditions.

62. A method according to claim 61, wherein the process information defines a process instruction excluding an identified feature.

63. A method according to claim 61, wherein the process information defines a process instruction modifying the classification of an identified feature.

64. A method according to claim 63, wherein the processing instruction comprises a classification rule for a feature.

65. A method according to claim 58, wherein the number generation process comprises the step of indexing the identified features in dependence on respective measurement values associated with the features, wherein the process information comprises at least one process instruction operable to modify the indexing of the features.

66. A method according to claim 65, wherein the process instruction defines an indexing rule for a plurality of features.

67. A method according to claim 49, wherein at least one of the set of measurements comprises applying a transform function and the corresponding measurement value is given by the respective transform co-efficient.

68. A method according to claim 67, wherein the applied transform is a fast Fourier transform.

69. A method according to claim 67, wherein the applied transform is a wavelet transform.

70. A method according to claim 67, wherein the applied transform is a Gabor transform.

71. A method according to claim 49, wherein at least one of the set of measurements comprises a pattern recognition operation.

72. A method according to claim 49, wherein at least one of the set of measurements is performed by segregating the analogue data set into plural parts, and individually measuring properties of the plural parts.

73. A method according to claim 72, wherein an average analogue data value is measured for each of the plural parts.

74. A method according to claim 49, wherein the number generation process comprises the steps of: deriving a plurality of data values and a plurality of error correction values using the set of measurement values, each data value being associated with at least one error correction value; processing the each data value and the corresponding at least one error correction value in accordance with stored error correction information to generate a plurality of adjusted data values; and
combining the adjusted data values to generate the number representative of the analogue source.

75. A method according to claim 74, wherein a bitwise exclusive-OR function is applied to each error correction value and a respective binary number stored in the error correction information.

76. A method according to claim 49, further comprising performing a pre-processing step prior to performing said set of measurements, the pre-processing step comprising generating aligning the received analogue data set using stored alignment data.

77. A method according to claim 76, wherein the alignment data identifies reference positions corresponding to a plurality of distinctive patterns within the analogue data set.

78. A method according to claim 77, wherein the alignment data further comprises the plurality of distinctive patterns stored in association with the corresponding locations.

79. A method according to claim 76, wherein the pre-processing step further comprises normalising the received analogue data set.

80. A method according to claim 49, wherein the analogue data source is a biological feature of an animal.

81. A method according to claim 80, wherein the analogue data source is the iris of an eye.

82. A method according to claim 80, wherein the analogue data source is a retina of an eye.

83. A method according to claim 80, wherein the analogue data source is a fingerprint.

84. A method according to claim 49, wherein the analogue data source is a photograph.

85. A storage device storing instructions including instructions for causing a programmable apparatus to perform a method according to claim 49.

86. A signal conveying instructions including instructions for causing a programmable apparatus to perform a method according to claim 49.

87. An apparatus for generating process information for a number generation process operable to generate a number representative of an analogue source from an analogue data set corresponding to the analogue source, the apparatus comprising:
a receiver operable to receive for an analogue source at least one training analogue data set representative of said analogue source;
a measurer operable to perform a set of measurements on each of the at least one training analogue data sets to obtain for each training analogue data set a corresponding set of measurement values suitable for processing by said number generation process;
an analyser operable to:
analyse, for at least one measurement of the set of measurements, the stability of the number generated by the number generation process in response to change in the corresponding measurement value; and
to determine at least one process instruction operable to modify the processing of the corresponding measurement value during the number generation process to improve the repeatability of numbers generated by the number generation process in case of change in said corresponding measurement value; and
an information generator operable to generate processing information indicative of the at least one determined process instruction, whereby the repeatability of the number generated by the number generation process is improved for subsequent performances of the number generation process on analogue data sets corresponding to the analogue source by using the processing information.

88. The apparatus according to claim 87, wherein the number generation process defines a sequence of numerical ranges, each numerical range having an upper numerical boundary and a lower numerical boundary, and generates the number representative of the analogue source in dependence upon the numerical range corresponding to a measurement value.

89. The apparatus according to claim 88, wherein said analyser comprises a determiner operable to determine for at least one of the set of measurements the position of the corresponding measurement value within said corresponding range, and operable to determine a process instruction operable to vary the relative position between the corresponding measurement value and at least one of the upper and lower numerical boundaries to increase the distance between the corresponding measurement value and the closest range numerical boundary.

90. The apparatus according to claim 89, wherein said analyser is arranged to determine a process instruction comprising an offset value to be added to the measurement value.

91. The apparatus according to claim 90, wherein the offset value is operable to position the corresponding measurement value in the middle of a numerical range.

92. The apparatus according to claim 88, wherein said analyser is operable to analyse a plurality of sets of measurement values corresponding respectively to a plurality of received training analogue data sets and for at least one of the set of measurements, to analyse statistically the respective measurement values for the plurality of training analogue data sets, and to determine a process instruction defining the sequence of numerical ranges associated with the respective measurement values in dependence upon said statistical analysis.

93. The apparatus according to claim 92, wherein the analyser is operable to analyse a plurality of measurements within the same set of measurements, and to determine process instructions defining respective different sequences of numerical ranges for each of said analysed plurality of measurements.

94. The apparatus according to claim 92, wherein said analyser is operable to perform said statistical analysis by calculating a value indicative of the standard deviation of the respective measurement values for the analysed measurement, wherein the analyser is operable to determine the upper and lower numerical boundaries of a numerical range in dependence upon said value indicative of the standard deviation.

95. The apparatus according to claim 87, wherein the number generation comprises identifying a plurality of features within each training analogue data set, the plurality of features being identified by one or more measurements of a set of measurements satisfying respective conditions.

96. The apparatus according to claim 95, wherein said analyser is operable to analyse the stability of the identification of a feature in case of variation in the corresponding measurement values, and to determine at least one process instruction operable to modify the identification of the feature to improve the repeatability of feature identifications to variation in said corresponding measurement values.

97. The apparatus according to claim 96, wherein the analyser is operable to analyse a plurality of sets of measurements corresponding to a plurality of training analogue data sets, and to determine a process instruction excluding a feature if the excluded feature is not identified in all the plurality of the set of measurements.

98. The apparatus according to claim 96, further comprising an indexer operable to index the identified features in dependence on respective measurement values associated with the features, wherein said analyser is operable to analyse the stability of the indexing to variation in the respective measurement values associated with the features, and to determine at least one process instruction operable to modify the indexing of the features to improve the repeatability of the indexing to variation in the respective measurement values.

99. The apparatus according to claim 98, wherein the process instruction defines an indexing rule for a plurality of features.

100. The apparatus according to claim 96, wherein said measurer is operable to measure a first set of measurements identifying features within the or each training analogue data set, and a second set of measurements measuring attributes of the identified features to obtain.

101. The apparatus according to claim 100, wherein the number generation comprises classifying features in a plurality of categories in dependence upon one or more of the second set of measurements satisfying a condition.

102. The apparatus according to claim 101, wherein the analyser is operable to analyse a plurality of sets of measurements corresponding to a respective plurality of training analogue data sets, and to determine a process instruction excluding a feature if the excluded feature is classified in different categories for different analogue data sets.

103. The apparatus according to claim 101, wherein the analyser is operable to perform a plurality of sets of measurements corresponding to a respective plurality of training analogue data sets, and to determine a process instruction excluding a feature if the excluded feature is classified in three or more different categories in different analogue data sets.

104. The apparatus according to claim 102, wherein if a feature is classified in two different categories in different analogue data sets, the analyser is operable to determine a process instruction modifying the classification.

105. The apparatus according to claim 104, wherein the analyser is operable to define a processing instruction comprises a classification rule for a feature.

106. The apparatus according to claim 86, wherein said measurer is operable to apply a transform function to a received training analogue data set to determine a corresponding measurement value.

107. The apparatus according to claim 106, wherein the measurer is operable to apply a fast Fourier transform.

108. The apparatus according to claim 106, wherein the measurer is operable to apply a wavelet transform.

109. The apparatus according to claim 106, wherein the measurer is operable to apply a Gabor transform.

110. The apparatus according to claim 87, wherein the measurer is operable to perform a pattern recognition operation.

111. The apparatus according to claim 87, wherein the measurer is operable to segregate the or each training analogue data set into plural parts, and to measure individual properties of the plural parts.

112. The apparatus according to claim 111, wherein the measurer is operable to measure an average analogue data value for each of the plural parts.

113. The apparatus according to claim 87, further comprising a number generator operable to generate said number representative of the analogue source.

114. The apparatus according to claim 113, wherein the number generator comprises: a deriver operable to derive a plurality of data values and a plurality of error correction values using the set of measurement values; a combiner operable to combine the data values to generate the number representative of the analogue source; and a calculator operable to calculate error correction information using the error correction values and the data values.

115. The apparatus according to claim 114, wherein the calculator comprises a processor operable to process each error correction value using an associated data value.

116. The apparatus according to claim 115, wherein said processor is operable to apply a bitwise exclusive-OR function to each error correction value and the corresponding data value to generate the error correction information.

117. The apparatus according to claim 114, further comprising a combiner operable to combine the error correction information and the processing information.

118. The apparatus according to claim 87, further comprising a pre-processor operable to perform a pre-processing operation to generate alignment data from the at least one received training analogue data set.

119. The apparatus according to claim 118, wherein the pre-processor comprises an aligner operable to align the information content of the plurality of training analogue data sets using the stored alignment data.

120. The apparatus according to claim 118, wherein the pre-processor is operable to generate alignment data by identifying a plurality of distinctive patterns within an analogue data set and storing the locations of the distinctive patterns.

121. The apparatus according to claim 120, further comprising a data store operable to store the distinctive pattern in association with the corresponding location.

122. The apparatus according to claim 118, further comprises a normaliser operable to normalise the training analogue data sets.

123. The apparatus according to claim 87, further comprising an imager operable to image a biological feature of an animal to generate the or each training analogue data set.

124. The apparatus according to claim 123, wherein the imager is adapted to image the iris of an eye.

125. The apparatus according to claim 123, wherein the imager is adapted to image a retina of an eye.

126. The apparatus according to claim 123, wherein the imager is a fingerprint sensor.

127. The apparatus according to claim 87, wherein the imager is adapted to image a photograph.

128. An apparatus for generating a number representative of an analogue source, the apparatus comprising:
a receiver operable to receive an analogue data set representative of the analogue source;
a measurer operable to perform a set of measurements on the analogue data set to obtain a set of measurement values;
a data store for storing process information indicative of processing instructions operable to modify selectively the processing of the set of measurement values to improve the stability of the generated number in case of variations in the set of measurement values obtained from different analogue data sets representative of the analogue source; and
a number generator operable to generate said number representative of the analogue source using the set of measurement values and using said processing instructions to improve the repeatability of the number generated by the number generation process for the analogue source.

129. An apparatus according to claim 128, wherein the number generator is operable to define a sequence of numerical ranges, each numerical range having an upper numerical boundary and a lower numerical boundary, and to generate the number representative of the analogue source in dependence upon the numerical range corresponding to a measurement value.

130. An apparatus according to claim 129, wherein said number generator is operable to vary the relative position between a measurement value and at least one of the upper and lower numerical boundaries of the corresponding numerical range in accordance with a processing instruction indicated by the process information.

131. An apparatus according to claim 130, wherein the number generator is operable to add an offset value to the measurement value.

132. An apparatus according to claim 131, wherein the offset value is operable to position the corresponding measurement value in the middle of a numerical range.

133. An apparatus according to 129, wherein said number generator is operable to define the upper and lower boundaries for the sequence of numerical ranges associated with the respective measurement values in accordance with process instructions indicated by the process information.

134. An apparatus according to claim 133, wherein the number generator is operable to define respective different sequences of numerical ranges for at least two measurement values in accordance with process instructions indicated by the process information.

135. An apparatus according to claim 133, wherein the determined process instruction sets the upper and lower numerical boundaries of the numerical ranges for a corresponding measurement value in dependence upon a predetermined standard deviation for the corresponding measurement value.

136. An apparatus according to claim 128, wherein the number generator comprises an identifier operable to identify a plurality of features within the analogue data set, the plurality of features being identified by one or more of the set of measurements satisfying respective conditions.

137. An apparatus according to claim 136, wherein said number generator is operable to modify the identification of a feature in accordance with a process instruction indicated by the process information.

138. An apparatus according to claim 137, wherein said number generator is operable to exclude a feature in accordance with a process instruction indicated by the process information.

139. An apparatus according to claim 137, wherein the number generator comprises an indexer operable to index the identified features in dependence on respective measurement values associated with the features, wherein the number generator is operable to modify the indexing of the features in accordance with a process instruction indicated by the process information.

140. An apparatus according to claim 139, wherein the process instruction defines an indexing rule for a plurality of features.

141. An apparatus according to claim 128, wherein said measurer is operable to perform a first set of measurements to obtain a first set of measurement values for identifying features within the analogue data sets, and a second set of measurements for measuring attributes of the identified features to obtain a second set of the measurement values.

142. An apparatus according to claim 141, wherein the number generator comprises a classifier operable to classify features in a plurality of categories in dependence upon one or more of the second set of measurements satisfying respective conditions.

143. An apparatus according to claim 142, wherein the number generator is operable to exclude an identified feature in accordance with a process instruction indicated by the process information.

144. An apparatus according to claim 142, wherein the number generator is operable to modify a classification of an identified feature in accordance with a process instruction indicated by the process information.

145. An apparatus according to claim 144, wherein the processing instruction comprises a classification rule for a feature.

146. An apparatus according to claim 128, wherein said measurer is operable to apply a transform function to a received training analogue data set to determine a corresponding measurement value.

147. An apparatus according to claim 146, wherein the measurer is operable to apply a fast Fourier transform.

148. An apparatus according to claim 146, wherein the measurer is operable to apply a wavelet transform.

149. An apparatus according to claim 146, wherein the measurer is operable to apply a Gabor transform.

150. An apparatus according to claim 149, further comprising a pre-processor operable to perform a pre-processing operation to generate alignment data from the at least one received training analogue data set.

151. An apparatus according to claim 150, wherein the pre-processor comprises an aligner operable to align the information content of the plurality of training analogue data sets using the stored alignment data.

152. An apparatus according to claim 150, wherein the pre-processor is operable to generate alignment data by identifying a plurality of distinctive patterns within an analogue data set and storing the locations of the distinctive patterns.

153. An apparatus according to claim 152, further comprising a data store operable to store the distinctive pattern in association with the corresponding location.

154. An apparatus according to claim 128, wherein the measurer is operable to perform a pattern recognition operation.

155. An apparatus according to claim 128, wherein the measurer is operable to segregate the or each training analogue data set into plural parts, and to measure individual properties of the plural parts.

156. An apparatus according to claim 155, wherein the measurer is operable to measure an average analogue data value for each of the plural parts.

157. An apparatus according to claim 128, wherein the number generator comprises: a deriver operable to derive a plurality of data values and a plurality of error correction values using the set of measurement values; a combiner operable to combine the data values to generate the number representative of the analogue source; and a calculator operable to calculate error correction information using the error correction values and the data values.

158. An apparatus according to claim 157, wherein the calculator comprises a processor operable to process each error correction value using an associated data value.

159. An apparatus according to claim 158, wherein said processor is operable to apply a bitwise exclusive-OR function to each error correction value and the corresponding data value to generate the error correction information.

160. An apparatus according to claim 157, further comprising a combiner operable to combine the error correction information and the processing information.

161. An apparatus according to claim 160, further comprising a normaliser operable to normalise the training analogue data sets.

162. An apparatus according to claim 128, further comprising an image operable to image a biological feature of an animal to generate the or each training analogue data set.

163. An apparatus according to claim 162, wherein the imager is adapted to image the iris of an eye.

164. An apparatus according to claim 162, wherein the imager is adapted to image a retina of an eye.

165. An apparatus according to claim 162, wherein the imager is a fingerprint sensor.

166. An apparatus according to claim 128, wherein the imager is adapted to image a photograph.

* * * * *